United States Patent
Dong

(10) Patent No.: US 10,812,621 B2
(45) Date of Patent: Oct. 20, 2020

(54) RADIO SIGNAL PROCESSING APPARATUS AND METHOD, AND TERMINAL

(71) Applicant: Huawei Technologies Co., Ltd., Shenzhen (CN)

(72) Inventor: Mingjie Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 216 days.

(21) Appl. No.: 15/282,155

(22) Filed: Sep. 30, 2016

(65) Prior Publication Data
US 2017/0019502 A1   Jan. 19, 2017

Related U.S. Application Data

(63) Continuation of application No. PCT/CN2015/075537, filed on Mar. 31, 2015.

(30) Foreign Application Priority Data

Apr. 1, 2014   (CN) .......................... 2014 1 0132521

(51) Int. Cl.
| | |
|---|---|
| *H04L 12/26* | (2006.01) |
| *H04L 29/08* | (2006.01) |
| *H02J 50/20* | (2016.01) |
| *H04L 29/06* | (2006.01) |
| *H04W 52/52* | (2009.01) |
| *H02J 7/02* | (2016.01) |
| *H04B 5/00* | (2006.01) |
| *H04W 88/02* | (2009.01) |

(52) U.S. Cl.
CPC ............ *H04L 67/327* (2013.01); *H02J 50/20* (2016.02); *H04L 69/22* (2013.01); *H04W 52/52* (2013.01); *H02J 7/025* (2013.01); *H04B 5/0037* (2013.01); *H04W 88/02* (2013.01)

(58) Field of Classification Search
CPC ..................................... H04L 67/327
See application file for complete search history.

(56) References Cited

U.S. PATENT DOCUMENTS

| | | | | |
|---|---|---|---|---|
| 6,313,612 | B1 * | 11/2001 | Honda .................. | G04C 10/00 320/139 |
| 6,721,540 | B1 | 4/2004 | Hayakawa | |
| 8,432,293 | B2 * | 4/2013 | Symons ................. | H02J 7/025 340/854.8 |
| 8,478,212 | B2 * | 7/2013 | Moon .................... | H01Q 1/248 375/295 |
| 8,629,578 | B2 * | 1/2014 | Kurs ..................... | B60L 11/182 307/104 |
| 9,240,824 | B2 * | 1/2016 | Hillan .................... | H04B 5/00 |

(Continued)

FOREIGN PATENT DOCUMENTS

| | | | |
|---|---|---|---|
| CN | 1297600 A | 5/2001 | |
| CN | 102780515 A * | 11/2012 | .......... H04B 5/0031 |

(Continued)

*Primary Examiner* — Guang W Li
(74) *Attorney, Agent, or Firm* — Slater Matsil, LLP

(57) ABSTRACT

The present invention belongs to the communications field, and discloses a radio signal processing apparatus and method, and a terminal. This not only can avoid wasting resources, but also can fully use a received radio signal, thereby improving usage of using a received radio signal.

33 Claims, 4 Drawing Sheets

(56) References Cited

U.S. PATENT DOCUMENTS

| | | | |
|---|---|---|---|
| 2007/0015465 A1 | 1/2007 | Giroud et al. | |
| 2008/0252254 A1* | 10/2008 | Osada | H01M 10/0436 320/108 |
| 2008/0272889 A1* | 11/2008 | Symons | H02J 7/025 340/10.1 |
| 2008/0296978 A1* | 12/2008 | Finkenzeller | G06K 7/0008 307/104 |
| 2009/0312046 A1* | 12/2009 | Clevenger | H02J 50/80 455/522 |
| 2010/0068996 A1* | 3/2010 | Haartsen | H04B 5/0025 455/41.1 |
| 2010/0190436 A1* | 7/2010 | Cook | H04B 5/00 455/41.1 |
| 2010/0203831 A1* | 8/2010 | Muth | H02J 17/00 455/41.2 |
| 2010/0279606 A1* | 11/2010 | Hillan | H04B 5/00 455/41.1 |
| 2011/0127951 A1* | 6/2011 | Walley | H02J 7/025 320/108 |
| 2011/0218014 A1* | 9/2011 | Abu-Qahouq | H02J 50/80 455/522 |
| 2011/0234379 A1* | 9/2011 | Lee | H04M 1/72519 340/10.1 |
| 2011/0256897 A1* | 10/2011 | Taoka | H04B 7/0615 455/509 |
| 2012/0149301 A1* | 6/2012 | Wiley | H04B 5/0031 455/41.1 |
| 2012/0214536 A1* | 8/2012 | Kim | H02J 7/00034 455/522 |
| 2013/0217326 A1* | 8/2013 | Symons | H02J 7/025 455/41.1 |
| 2013/0311798 A1* | 11/2013 | Sultenfuss | H02J 7/025 713/310 |
| 2014/0194058 A1* | 7/2014 | Lee | A61N 1/3787 455/41.1 |
| 2014/0194092 A1* | 7/2014 | Wanstedt | H04W 4/24 455/406 |
| 2014/0232334 A1 | 8/2014 | Konanur et al. | |
| 2015/0065041 A1* | 3/2015 | Ahn | H02J 5/005 455/41.1 |
| 2015/0087228 A1* | 3/2015 | Porat | H04B 5/02 455/41.1 |
| 2016/0029319 A1* | 1/2016 | Rajakarunanayake | H04B 5/0037 455/573 |
| 2016/0268843 A1* | 9/2016 | Baarman | H02J 7/025 |
| 2017/0098951 A1* | 4/2017 | Olgun | H02J 7/025 |
| 2018/0366989 A1* | 12/2018 | Lee | H02J 50/40 |

FOREIGN PATENT DOCUMENTS

| | | | |
|---|---|---|---|
| CN | 102780515 A | 11/2012 | |
| EP | 1096641 A1 | 5/2001 | |
| JP | 3794267 B2 | 7/2006 | |
| KR | 20120110662 A | 10/2012 | |
| KR | 20130125834 A | 11/2013 | |
| KR | 101350312 B1 | 1/2014 | |
| WO | WO-2014015779 A1 * | 1/2014 | H04B 5/0031 |

* cited by examiner

RADIO SIGNAL PROCESSING APPARATUS AND METHOD, AND TERMINAL

CROSS-REFERENCE TO RELATED APPLICATIONS

This application is a continuation of International Application No. PCT/CN2015/075537, filed on Mar. 31, 2015, which claims priority to Chinese Patent Application No. 201410132521.2, filed on Apr. 1, 2014. The aforementioned applications are hereby incorporated by reference in their entireties.

TECHNICAL FIELD

The present invention relates to the communications field, and in particular, to a radio signal processing apparatus and method, and a terminal.

BACKGROUND

A wireless communications technology is a communication manner in which information is exchanged by using a property that a radio signal can be freely propagated in space. As communications technologies rapidly develop, wireless communications technologies become increasingly mature, and are already applied to many information transmission fields to implement communication, which brings great convenience to life of people. When a wireless communications technology is used to implement communication, signals transferred between a radio-signal transmit end and a radio-signal receive end are all radio signals, and after receiving a radio signal, the radio-signal receive end needs to process the received radio signal to obtain communication information carried in the radio signal. In addition, because a radio signal is a type of electric energy, the radio signal can be used not only to transmit communication information, but also to collect energy. For example, a wireless charging technology is a technology in which charging is performed by using energy that is collected by using a radio signal.

Generally, radio signals received by a radio-signal receive end have two functions, that is, a radio signal used for communication and a radio signal used for wireless charging. When a radio signal is used for communication, a data packet that needs to be processed is usually carried in the radio signal, and the data packet carries communication information. Therefore, when a radio signal used for communication is processed in a related technology, a used method is: receiving, by a radio-signal receive end, at least one radio signal; and selecting, from the received radio signal, a radio signal that carries a data packet that needs to be processed, and then processing the radio signal that carries the data packet that needs to be processed; or if a received radio signal does not carry a data packet that needs to be processed, discarding the radio signal. In addition, an example in which wireless charging is performed by using a collected radio signal is used. In a related technology, when a radio-signal receive end performs wireless charging by using a received radio signal, the radio-signal receive end also selects, from the received radio signal, a radio signal used to perform wireless charging, and performs wireless charging by using the radio signal selected; or if a received radio signal is not a radio signal used for wireless charging, the radio-signal receive end discards the radio signal.

In a process of implementing the present invention, the inventor finds that the related technology has at least the following problems:

Because when a radio signal is processed in a related technology, radio signals received by a radio-signal receive end are definitely classified into two types: a radio signal used to perform communication and a radio signal used for wireless charging. That is, in the related technology, processes of processing a radio signal used to perform communication and a radio signal used for wireless charging are two relatively independent processes. For a radio signal used to perform communication, a radio signal is processed when the radio signal carries a data packet that needs to be processed; otherwise, the radio signal is discarded. Because a radio signal that does not carry a data packet that needs to be processed carries some energy, resource waste is easily caused if the radio signal is directly discarded. Moreover, some system resources are wasted because the radio-signal receive end receives does not carry a data packet that needs to be processed. For a radio signal used to perform wireless charging, if a received radio signal is not a radio signal used for wireless charging, the signal is discarded, which also causes resource waste.

SUMMARY

To resolve a problem in a related technology, embodiments of the present invention provide a radio signal processing apparatus and method, and a terminal. The technical solutions are as follows:

According to a first aspect, a radio signal processing apparatus is provided, where the apparatus includes a processor, a memory storing a program to be executed on the processor, the program comprising a plurality of modules of instruction, the plurality of modules comprising an acquiring module, a preprocessing module, an information processing module, and an energy collection module. The acquiring module is configured to acquire at least one radio signal received by an antenna of a wireless communications system thereof, and send the acquired radio signal to the preprocessing module to perform processing. The preprocessing module is configured to determine whether a radio signal that is being currently processed carries a data packet that needs to be processed. In response to determining that the radio signal that is being currently processed carries the data packet that needs to be processed, the radio signal that is being currently processed is sent to the information processing module for processing. Alternatively, in response to determining that the radio signal that is being currently processed does not carry the data packet that needs to be processed, the radio signal that is being currently processed is sent to the energy collection module for processing. The information processing module is configured to receive the radio signal that is being currently processed and that is sent by the preprocessing module, and extract communication information carried in the data packet carried in the radio signal that is being currently processed. The energy collection module is configured to receive the radio signal that is being currently processed and that is sent by the preprocessing module, and collect energy of the radio signal that is being currently processed.

With reference to the first aspect, in a first possible implementation manner of the first aspect, the preprocessing module includes a first acquiring unit and a first determining unit. The first acquiring unit is configured to acquire a signal property of the radio signal that is being currently processed. A first determining unit, configured to determine, according to the signal property of the radio signal that is being currently processed, whether the radio signal that is being currently processed carries the data packet that needs to be processed.

With reference to the first possible implementation manner of the first aspect, in a second possible implementation manner of the first aspect, the signal property includes a center frequency of the signal, and the first acquiring unit is configured to acquire the center frequency of the radio signal that is being currently processed. The first determining unit is configured to: perform matching between the center frequency of the radio signal that is being currently processed and a center frequency of an operating channel of the wireless communications system thereof, and when the center frequency of the radio signal that is being currently processed is consistent with the center frequency of the operating channel of the wireless communications system thereof, determine that the radio signal that is being currently processed carries the data packet that needs to be processed.

With reference to the first aspect, in a third possible implementation manner of the first aspect, the apparatus further includes a wireless transceiver scheduling and management module. The wireless transceiver scheduling and management module includes an acquiring unit, configured to acquire input feedback information, where the input feedback information is used to indicate whether the radio signal that is being currently processed carries the data packet that needs to be processed; and a sending unit, configured to send the input feedback information to the preprocessing module. The preprocessing module includes: a second acquiring unit, configured to acquire the input feedback information acquired by the wireless transceiver scheduling and management module; and a second determining unit, configured to determine, according to the input feedback information, whether the radio signal that is being currently processed carries the data packet that needs to be processed.

With reference to the third possible implementation manner of the first aspect, in a fourth possible implementation manner of the first aspect, the input feedback information includes a moment at which a radio signal that carries the data packet that needs to be processed is input, and the second acquiring unit is configured to acquire the moment at which the radio signal that carries the data packet that needs to be processed is input. The second determining unit is configured to: determine a moment at which the radio signal that is being currently processed is received, and perform matching between the moment at which the radio signal that is being currently processed is received and the moment at which the radio signal that carries the data packet that needs to be processed is input; and when the moment at which the radio signal that is being currently processed is received matches the moment at which the radio signal that carries the data packet that needs to be processed is input, determine that the radio signal that is being currently processed carries the data packet that needs to be processed.

With reference to the fourth possible implementation manner of the first aspect, in a fifth possible implementation manner of the first aspect, the acquiring unit in the wireless transceiver scheduling and management module is configured to determine the moment at which the radio signal that carries the data packet that needs to be processed is input, and generate the input feedback information that includes the moment at which the radio signal that carries the data packet that needs to be processed is input.

With reference to the third possible implementation manner of the first aspect, in a sixth possible implementation manner of the first aspect, the input feedback information includes indication information of a previous signal of the radio signal that is being currently processed, and the second acquiring unit is configured to acquire the indication information of the previous signal of the radio signal that is being currently processed. The second determining unit is configured to: determine whether the indication information of the previous signal of the radio signal that is being currently processed indicates that a next radio signal that carries the data packet that needs to be processed exists, and when the indication information of the previous signal of the radio signal that is being currently processed indicates that the next radio signal that carries the data packet that needs to be processed exists, determine that the radio signal that is being currently processed carries the data packet that needs to be processed.

With reference to the sixth possible implementation manner of the first aspect, in a seventh possible implementation manner of the first aspect, the acquiring unit in the wireless transceiver scheduling and management module is configured to acquire, from the information processing module, the indication information of the previous signal of the radio signal that is being currently processed, and acquire, by using the indication information of the previous signal of the radio signal that is being currently processed as the input feedback information, the input feedback information that includes the indication information of the previous signal of the radio signal that is being currently processed.

With reference to the first aspect, in an eighth possible implementation manner of the first aspect, the preprocessing module includes: a third determining unit, configured to determine an antenna that receives the radio signal that is being currently processed. A fourth determining unit is configured to determine whether the antenna that receives the radio signal that is being currently processed is a preset antenna configured to receive a radio signal that carries the data packet that needs to be processed. A fifth determining unit is configured to: when it is determined that the antenna that receives the radio signal that is being currently processed is the preset antenna configured to receive the radio signal that carries the data packet that needs to be processed, determine that the radio signal that is being currently processed carries the data packet that needs to be processed.

With reference to any possible implementation manner of the first possible implementation manner of the first aspect to the eighth possible implementation manner of the first aspect, in a ninth possible implementation manner of the first aspect, the apparatus further includes: a parsing module, configured to parse the radio signal that is being currently processed, and obtain, according to a parsing result, a signal format of the radio signal that is being currently processed. The preprocessing module includes: a sixth determining unit, configured to determine, according to the signal format of the radio signal that is being currently processed, whether the radio signal that is being currently processed is a radio signal of the wireless communications system thereof; and a seventh determining unit, configured to: when it is determined that the radio signal that is being currently processed is a radio signal of the wireless communications system thereof, determine whether the radio signal that is being currently processed carries the data packet that needs to be processed.

With reference to the first aspect, in a tenth possible implementation manner of the first aspect, the apparatus further includes: a gain adjustment module, configured to: when the radio signal that is being currently processed carries the data packet that needs to be processed, reduce a gain value of an antenna that receives the radio signal that is being currently processed, or when the radio signal that is being currently processed does not carry the data packet that needs to be processed, increase a gain value of an antenna that receives the radio signal that is being currently processed.

According to a second aspect, a radio signal processing method is provided. The method includes acquiring at least one radio signal received by an antenna of a wireless communications system and determining whether a radio signal that is being currently processed carries a data packet that needs to be processed. In response to determining that the radio signal that is being currently processed carries the data packet that needs to be processed, communication information carried in the data packet is extracted. Alternatively, in response to determining that the radio signal that is being currently processed does not carry the data packet that needs to be processed, energy of the radio signal that is being currently processed is collected.

With reference to the second aspect, in a first possible implementation manner of the second aspect, the determining whether a radio signal that is being currently processed carries a data packet that needs to be processed includes: acquiring a signal property of the radio signal that is being currently processed; and determining, according to the signal property of the radio signal that is being currently processed, whether the radio signal that is being currently processed carries the data packet that needs to be processed.

With reference to the first possible implementation manner of the second aspect, in a second possible implementation manner of the second aspect, the signal property includes a center frequency of the signal, and the acquiring a signal property of the radio signal that is being currently processed includes: acquiring the center frequency of the radio signal that is being currently processed; and the determining, according to the signal property of the radio signal that is being currently processed, whether the radio signal that is being currently processed carries the data packet that needs to be processed includes: performing matching between the center frequency of the radio signal that is being currently processed and a center frequency of an operating channel of the wireless communications system thereof; and if the center frequency of the radio signal that is being currently processed is consistent with the center frequency of the operating channel of the wireless communications system thereof, determining that the radio signal that is being currently processed carries the data packet that needs to be processed.

With reference to the second aspect, in a third possible implementation manner of the second aspect, the determining whether a radio signal that is being currently processed carries a data packet that needs to be processed includes: acquiring input feedback information; and determining, according to the input feedback information, whether the radio signal that is being currently processed carries the data packet that needs to be processed.

With reference to the third possible implementation manner of the second aspect, in a fourth possible implementation manner of the second aspect, the input feedback information includes a moment at which a radio signal that carries the data packet that needs to be processed is input, and the acquiring input feedback information includes: acquiring the moment at which the radio signal that carries the data packet that needs to be processed is input; and the determining, according to the input feedback information, whether the radio signal that is being currently processed carries the data packet that needs to be processed includes: determining a moment at which the radio signal that is being currently processed is received; performing matching between the moment at which the radio signal that is being currently processed is received and the moment at which the radio signal that carries the data packet that needs to be processed is input; and if the moment at which the radio signal that is being currently processed is received matches the moment at which the radio signal that carries the data packet that needs to be processed is input, determining that the radio signal that is being currently processed carries the data packet that needs to be processed.

With reference to the fourth possible implementation manner of the second aspect, in a fifth possible implementation manner of the second aspect, the acquiring the moment at which the radio signal that carries the data packet that needs to be processed is input includes: determining the moment at which the radio signal that carries the data packet that needs to be processed is input; and generating the input feedback information that includes the moment at which the radio signal that carries the data packet that needs to be processed is input.

With reference to the third possible implementation manner of the second aspect, in a sixth possible implementation manner of the second aspect, the input feedback information includes indication information of a previous signal of the radio signal that is being currently processed, and the acquiring input feedback information includes: acquiring the indication information of the previous signal of the radio signal that is being currently processed; and the determining, according to the input feedback information, whether the radio signal that is being currently processed carries the data packet that needs to be processed includes determining whether the indication information of the previous signal of the radio signal that is being currently processed indicates that a next radio signal that carries the data packet that needs to be processed exists; and if the indication information of the previous signal of the radio signal that is being currently processed indicates that the next radio signal that carries the data packet that needs to be processed exists, determining that the radio signal that is being currently processed carries the data packet that needs to be processed.

With reference to the sixth possible implementation manner of the second aspect, in a seventh possible implementation manner of the second aspect, the acquiring the indication information of the previous signal of the radio signal that is being currently processed includes: processing the previous signal of the radio signal that is being currently processed, to acquire the indication information of the previous signal of the radio signal that is being currently processed, and acquiring, by using the indication information of the previous signal of the radio signal that is being currently processed as the input feedback information, the input feedback information that includes the indication information of the previous signal of the radio signal that is being currently processed.

With reference to the second aspect, in an eighth possible implementation manner of the second aspect, the determining whether a radio signal that is being currently processed carries a data packet that needs to be processed includes: determining an antenna that receives the radio signal that is being currently processed; determining whether the antenna that receives the radio signal that is being currently processed is a preset antenna configured to receive a radio signal that carries the data packet that needs to be processed; and if it is determined that the antenna that receives the radio signal that is being currently processed is the preset antenna configured to receive the radio signal that carries the data packet that needs to be processed, determining that the radio signal that is being currently processed carries the data packet that needs to be processed.

With reference to any possible implementation manner of the first possible implementation manner of the second aspect to the eighth possible implementation manner of the second aspect, in a ninth possible implementation manner of the second aspect, before the determining whether a radio signal that is being currently processed carries a data packet that needs to be processed, the method further includes: parsing the radio signal that is being currently processed; obtaining, according to a parsing result, a signal format of the radio signal that is being currently processed; determining, according to the signal format of the radio signal that is being currently processed, whether the radio signal that is being currently processed is a radio signal of the wireless communications system thereof; and if it is determined that the radio signal that is being currently processed is a radio signal of the wireless communications system thereof, performing the step of determining whether a radio signal that is being currently processed carries a data packet that needs to be processed.

With reference to the second aspect, in a tenth possible implementation manner of the second aspect, after the determining whether a radio signal that is being currently processed carries a data packet that needs to be processed, the method further includes: if the radio signal that is being currently processed carries the data packet that needs to be processed, reducing a gain value of an antenna that receives the radio signal that is being currently processed; or if the radio signal that is being currently processed does not carry the data packet that needs to be processed, increasing a gain value of an antenna that receives the radio signal that is being currently processed.

According to a third aspect, a terminal is provided, where the terminal includes: at least one processor and receiver, where the receiver is configured to acquire at least one radio signal received by an antenna of a wireless communications system thereof, and send the acquired radio signal to the processor to perform processing; and the processor is configured to: determine whether a radio signal that is being currently processed carries a data packet that needs to be processed; and if the radio signal that is being currently processed carries the data packet that needs to be processed, extract communication information carried in the data packet carried in the radio signal that is being currently processed; or if the radio signal that is being currently processed does not carry the data packet that needs to be processed, collect energy of the radio signal that is being currently processed.

With reference to the third aspect, in a first possible implementation manner of the third aspect, the processor is further configured to acquire a signal property of the radio signal that is being currently processed, and determine, according to the signal property of the radio signal that is being currently processed, whether the radio signal that is being currently processed carries the data packet that needs to be processed.

With reference to the first possible implementation manner of the third aspect, in a second possible implementation manner of the third aspect, the signal property includes a center frequency of the signal, and the processor is further configured to: acquire the center frequency of the radio signal that is being currently processed, and perform matching between the center frequency of the radio signal that is being currently processed and a center frequency of an operating channel of the wireless communications system thereof; and if the center frequency of the radio signal that is being currently processed is consistent with the center frequency of the operating channel of the wireless communications system thereof, determine that the radio signal that is being currently processed carries the data packet that needs to be processed.

With reference to the third aspect, in a third possible implementation manner of the third aspect, the processor is further configured to acquire input feedback information, and determine, according to the input feedback information, whether the radio signal that is being currently processed carries the data packet that needs to be processed.

With reference to the third possible implementation manner of the third aspect, in a fourth possible implementation manner of the third aspect, the input feedback information includes a moment at which a radio signal that carries the data packet that needs to be processed is input, and the processor is further configured to: acquire the moment at which the radio signal that carries the data packet that needs to be processed is input, and determine a moment at which the radio signal that is being currently processed is received; perform matching between the moment at which the radio signal that is being currently processed is received and the moment at which the radio signal that carries the data packet that needs to be processed is input; and if the moment at which the radio signal that is being currently processed is received matches the moment at which the radio signal that carries the data packet that needs to be processed is input, determine that the radio signal that is being currently processed carries the data packet that needs to be processed.

With reference to the fourth possible implementation manner of the third aspect, in a fifth possible implementation manner of the third aspect, the processor is further configured to determine the moment at which the radio signal that carries the data packet that needs to be processed is input, and generate the input feedback information that includes the moment at which the radio signal that carries the data packet that needs to be processed is input.

With reference to the third possible implementation manner of the third aspect, in a sixth possible implementation manner of the third aspect, the input feedback information includes indication information of a previous signal of the radio signal that is being currently processed, and the processor is further configured to: acquire the indication information of the previous signal of the radio signal that is being currently processed, and determine whether the indication information of the previous signal of the radio signal that is being currently processed indicates that a next radio signal that carries the data packet that needs to be processed exists; and if the indication information of the previous signal of the radio signal that is being currently processed indicates that the next radio signal that carries the data packet that needs to be processed exists, determine that the radio signal that is being currently processed carries the data packet that needs to be processed.

With reference to the sixth possible implementation manner of the third aspect, in a seventh possible implementation manner of the third aspect, the processor is further configured to process the previous signal of the radio signal that is being currently processed, to acquire the indication information of the previous signal of the radio signal that is being currently processed, and acquire, by using the indication information of the previous signal of the radio signal that is being currently processed as the input feedback information, the input feedback information that includes the indication information of the previous signal of the radio signal that is being currently processed.

With reference to the third aspect, in an eighth possible implementation manner of the third aspect, the processor is further configured to: determine an antenna that receives the radio signal that is being currently processed, and determine whether the antenna that receives the radio signal that is being currently processed is a preset antenna configured to receive a radio signal that carries the data packet that needs to be processed; and when it is determined that the antenna that receives the radio signal that is being currently processed is a preset antenna configured to receive a radio signal that carries the data packet that needs to be processed, determine that the radio signal that is being currently processed carries the data packet that needs to be processed.

With reference to any possible implementation manner of the first possible implementation manner of the third aspect to the eighth possible implementation manner of the third aspect, in a ninth possible implementation manner of the third aspect, the processor is further configured to: parse the radio signal that is being currently processed, and obtain, according to a parsing result, a signal format of the radio signal that is being currently processed; determine, according to the signal format of the radio signal that is being currently processed, whether the radio signal that is being currently processed is a radio signal of the wireless communications system thereof; and if it is determined that the radio signal that is being currently processed is a radio signal of the wireless communications system thereof, perform the step of determining whether the radio signal that is being currently processed carries the data packet that needs to be processed.

With reference to the third aspect, in a tenth possible implementation manner of the third aspect, the processor is further configured to: if the radio signal that is being currently processed carries the data packet that needs to be processed, reduce a gain value of an antenna that receives the radio signal that is being currently processed, or if the radio signal that is being currently processed does not carry the data packet that needs to be processed, increase a gain value of an antenna that receives the radio signal that is being currently processed.

Beneficial effects brought about by the technical solutions provided in the embodiments of the present invention are:

A preprocessing module determines whether a radio signal that is being currently processed carries a data packet that needs to be processed, and the radio signal that is being currently processed is allocated to an information processing module or an energy collection module according to a determining result, to perform processing. This not only can avoid wasting resources because the received radio signal that is being currently processed is a radio signal that is not used for communication or that is not used for wireless charging and the radio signal that is being currently processed is discarded, but also can fully use a received radio signal, thereby improving usage of using a received radio signal. In addition, after a radio signal that is being currently processed is received, the radio signal that is being currently processed is processed regardless of whether the radio signal that is being currently processed carries a data packet that needs to be processed; therefore, it is avoided that system resource waste is caused because the radio signal that is being currently processed is received, and therefore, radio signal processing efficiency can be improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
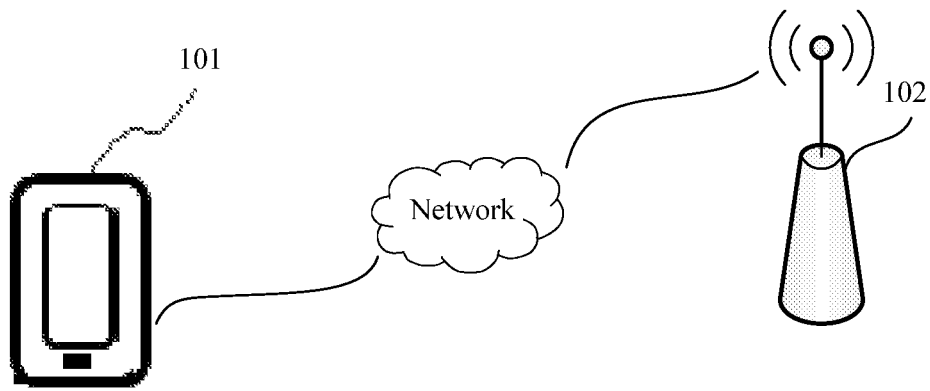
FIG. 1 is a schematic diagram of an implementation environment according to an embodiment of the present invention.

As shown in FIG. 1, FIG. 1 is a schematic diagram of an implementation environment according to an embodiment of the present invention. In the implementation environment, a terminal 101 and a network access device 102 may be included. The terminal 101 and the network access device 102 communicate with each other by using a wireless communication protocol, that is, the terminal 101 and the network access device 102 form a wireless communications system.

The terminal 101 includes, but is not limited to, a smartphone, a tablet computer, an ebook reader, an MP3 (Moving Picture Experts Group Audio Layer III) player, an MP4 (Moving Picture Experts Group Audio Layer IV) player, a portable laptop computer, a desktop computer, a wearable intelligent device, or the like. The network access device 102 includes, but is not limited to, an AP (Wireless Access Point), a base station, or the like. The wireless communication protocol by using which the terminal 101 and the network access device 102 communicate with each other includes, but is not limited to, WLAN (Wireless Local Area Network), GSM (Global System of Mobile communication), GPRS (General Packet Radio Service), or the like.

Figure 2:
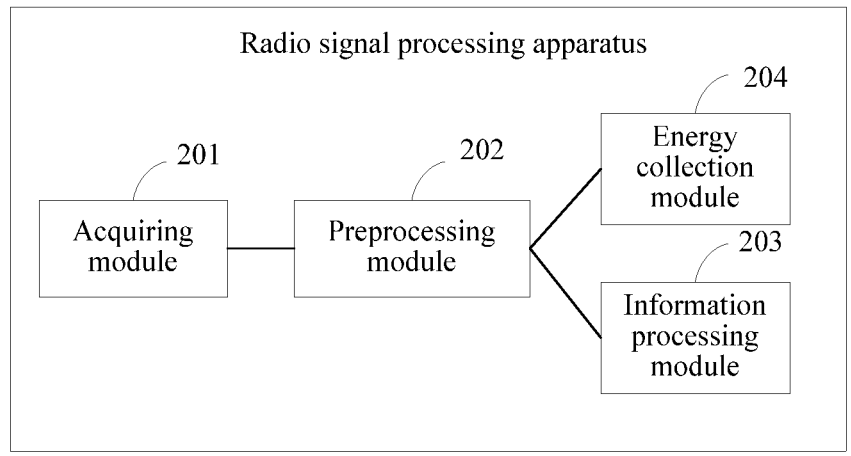
FIG. 2 is a schematic structural diagram of a radio signal processing apparatus according to another embodiment of the present invention.

The network access device 102 may wirelessly communicate with the terminal 101, and the terminal 101 may process a radio signal sent by the network access device 102. Specifically, for details of a radio signal processing apparatus and method, refer to the following embodiments:

With reference to the schematic diagram of the implementation environment shown in FIG. 1 and the foregoing content, FIG. 2 provides a schematic structural diagram of a radio signal processing apparatus according to an exemplary embodiment. As shown in FIG. 2, the apparatus includes an acquiring module 201, a preprocessing module 202, an information processing module 203, and an energy collection module 204. An end of the acquiring module 201 is connected to an antenna, another end of the acquiring module 201 is connected to the preprocessing module 202, and the preprocessing module 202 is separately connected to the information processing module 203 and the energy collection module 204.

The acquiring module 201 is configured to acquire at least one radio signal received by an antenna of a wireless communications system thereof, and send the acquired radio signal to the preprocessing module 202 to perform processing.

The preprocessing module 202 is configured to: determine whether a radio signal that is being currently processed carries a data packet that needs to be processed; and if determining that the radio signal that is being currently processed carries the data packet that needs to be processed, send the radio signal that is being currently processed to the information processing module 203 to perform processing; or if determining that the radio signal that is being currently processed does not carry the data packet that needs to be processed, send the radio signal that is being currently processed to the energy collection module 204 to perform processing.

Optionally, the preprocessing module 202 includes: a first acquiring unit, configured to acquire a signal property of the radio signal that is being currently processed; and a first determining unit, configured to determine, according to the signal property of the radio signal that is being currently processed, whether the radio signal that is being currently processed carries the data packet that needs to be processed.

Optionally, the signal property includes a center frequency of the signal, and the first acquiring unit is configured to acquire the center frequency of the radio signal that is being currently processed; and the first determining unit is configured to: perform matching between the center frequency of the radio signal that is being currently processed and a center frequency of an operating channel of the wireless communications system thereof, and when the center frequency of the radio signal that is being currently processed is consistent with the center frequency of the operating channel of the wireless communications system thereof, determine that the radio signal that is being currently processed carries the data packet that needs to be processed.

Optionally, the apparatus further includes a wireless transceiver scheduling and management module 207. The wireless transceiver scheduling and management module 207 includes: an acquiring unit, configured to acquire input feedback information, where the input feedback information is used to indicate whether the radio signal that is being currently processed carries the data packet that needs to be processed; and a sending unit, configured to send the input feedback information to the preprocessing module. The preprocessing module 202 includes: a second acquiring unit, configured to acquire the input feedback information acquired by the wireless transceiver scheduling and management module 207; and a second determining unit, configured to determine, according to the input feedback information, whether the radio signal that is being currently processed carries the data packet that needs to be processed.

Optionally, the input feedback information includes a moment at which a radio signal that carries the data packet that needs to be processed is input, and the second acquiring unit is configured to acquire the moment at which the radio signal that carries the data packet that needs to be processed is input. The second determining unit is configured to: determine a moment at which the radio signal that is being currently processed is received, and perform matching between the moment at which the radio signal that is being currently processed is received and the moment at which the radio signal that carries the data packet that needs to be processed is input; and when the moment at which the radio signal that is being currently processed is received matches the moment at which the radio signal that carries the data packet that needs to be processed is input, determine that the radio signal that is being currently processed carries the data packet that needs to be processed.

Optionally, the acquiring unit in the wireless transceiver scheduling and management module 207 is configured to determine the moment at which the radio signal that carries the data packet that needs to be processed is input, and generate the input feedback information that includes the moment at which the radio signal that carries the data packet that needs to be processed is input.

Optionally, the input feedback information includes indication information of a previous signal of the radio signal that is being currently processed, and the second acquiring unit is configured to acquire the indication information of the previous signal of the radio signal that is being currently processed. The second determining unit is configured to: determine whether the indication information of the previous signal of the radio signal that is being currently processed indicates that a next radio signal that carries the data packet that needs to be processed exists, and when the indication information of the previous signal of the radio signal that is being currently processed indicates that the next radio signal that carries the data packet that needs to be processed exists, determine that the radio signal that is being currently processed carries the data packet that needs to be processed.

Optionally, the acquiring unit in the wireless transceiver scheduling and management module 207 is configured to acquire, from the information processing module 203, the indication information of the previous signal of the radio signal that is being currently processed, and acquire, by using the indication information of the previous signal of the radio signal that is being currently processed as the input feedback information, the input feedback information that includes the indication information of the previous signal of the radio signal that is being currently processed.

Optionally, the preprocessing module 202 includes: a third determining unit, configured to determine an antenna that receives the radio signal that is being currently processed; a fourth determining unit, configured to determine whether the antenna that receives the radio signal that is being currently processed is a preset antenna configured to receive a radio signal that carries the data packet that needs to be processed; and a fifth determining unit, configured to: when it is determined that the antenna that receives the radio signal that is being currently processed is the preset antenna configured to receive the radio signal that carries the data packet that needs to be processed, determine that the radio signal that is being currently processed carries the data packet that needs to be processed.

Figure 3:
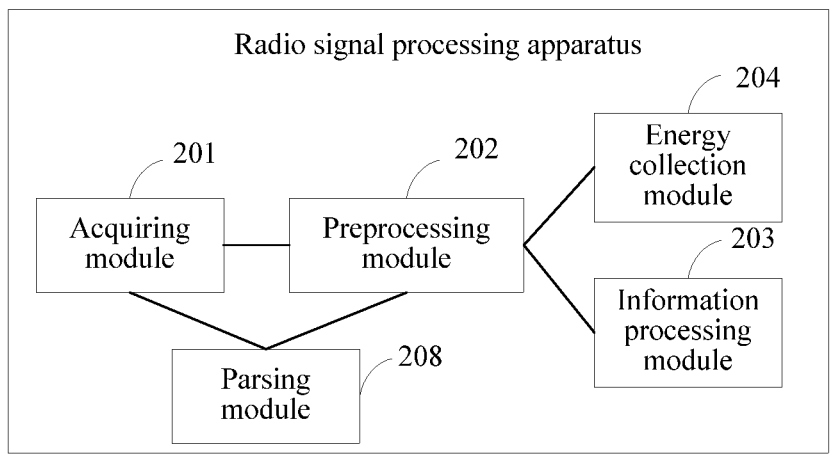
FIG. 3 is a schematic structural diagram of a radio signal processing apparatus according to another embodiment of the present invention.

Optionally, referring to FIG. 3, the apparatus further includes: a parsing module 208, configured to parse the radio signal that is being currently processed, and obtain, according to a parsing result, a signal format of the radio signal that is being currently processed; and the preprocessing module 202 includes: a sixth determining unit, configured to determine, according to the signal format of the radio signal that is being currently processed, whether the radio signal that is being currently processed is a radio signal of the wireless communications system thereof; and a seventh determining unit, configured to: when it is determined that the radio signal that is being currently processed is a radio signal of the wireless communications system thereof, determine whether the radio signal that is being currently processed carries the data packet that needs to be processed.

The information processing module 203 is configured to receive the radio signal that is being currently processed and that is sent by the preprocessing module 202, and extract communication information carried in the data packet carried in the radio signal that is being currently processed.

The energy collection module 204 is configured to receive the radio signal that is being currently processed and that is sent by the preprocessing module 202, and collect energy of the radio signal that is being currently processed.

Figure 4:
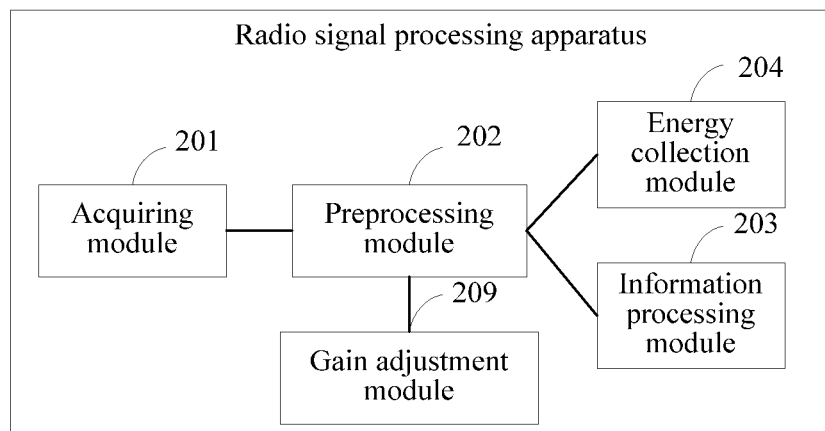
FIG. 4 is a schematic structural diagram of a radio signal processing apparatus according to another embodiment of the present invention.

Optionally, referring to FIG. 4, the apparatus further includes: a gain adjustment module 209, configured to: when the radio signal that is being currently processed carries the data packet that needs to be processed, reduce a gain value of an antenna that receives the radio signal that is being currently processed, or when the radio signal that is being currently processed does not carry the data packet that needs to be processed, increase a gain value of an antenna that receives the radio signal that is being currently processed.

According to the apparatus provided in this embodiment of the present invention, the preprocessing module determines whether a radio signal that is being currently processed carries a data packet that needs to be processed, and the radio signal that is being currently processed is allocated to the information processing module or the energy collection module according to a determining result, to perform processing. This not only can avoid wasting resources because the received radio signal that is being currently processed is a radio signal that is not used for communication or that is not used for wireless charging and the radio signal that is being currently processed is discarded, but also can fully use a received radio signal, thereby improving usage of using a received radio signal. In addition, after a radio signal that is being currently processed is received, the radio signal that is being currently processed is processed regardless of whether the radio signal that is being currently processed carries a data packet that needs to be processed; therefore, it is avoided that system resource waste is caused because the radio signal that is being currently processed is received, and therefore, radio signal processing efficiency can be improved.

Figure 5:
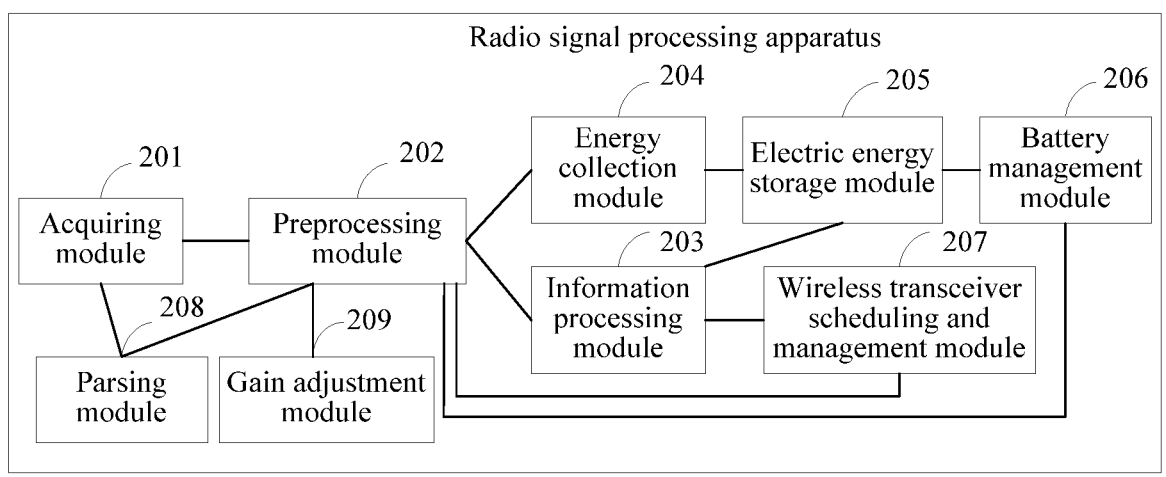
FIG. 5 is a schematic structural diagram of a radio signal processing apparatus according to another embodiment of the present invention.

With reference to the schematic diagram of the implementation environment shown in FIG. 1 and the content in the embodiments corresponding to FIG. 2 to FIG. 4, FIG. 5 provides a radio signal processing apparatus according to an exemplary embodiment. Referring to FIG. 5, the apparatus includes: an acquiring module 201, a preprocessing module 202, an information processing module 203, an energy collection module 204, an electric energy storage module 205, a battery management module 206, a wireless transceiver scheduling and management module 207, a parsing module 208, and a gain adjustment module 209. As shown in FIG. 5, an end of the acquiring module 201 is connected to an antenna, another end of the acquiring module 201 is connected to the preprocessing module 202, the preprocessing module 202 is separately connected to the information processing module 203 and the energy collection module 204, the information processing module 203 is connected to the wireless transceiver scheduling and management module 207, the energy collection module 204 is connected to the electric energy storage module 205, and the electric energy storage module 205 is connected to the battery management module 206. Moreover, the electric energy storage module 205 is further connected to the information processing module 203, the battery management module 206 is further connected to the preprocessing module 202, and the wireless transceiver scheduling and management module 207 is further connected to the preprocessing module 202. An end of the parsing module 208 is connected to the acquiring module 201, and another end of the parsing module 208 is connected to the preprocessing module 202. The gain adjustment module 209 is connected to the preprocessing module 202. For details of functions of the modules included in the apparatus and working manners of the modules, refer to the following description:

The acquiring module 201 is configured to acquire at least one radio signal received by an antenna of a wireless communications system thereof, and send the acquired radio signal to the preprocessing module 202 to perform processing.

To implement processing on a radio signal, one or more antennas are usually disposed at a wireless communications system at which the radio signal processing apparatus is located, and are configured to receive and send a radio signal. Various radio signals exist in space around an antenna, and the signals include a radio signal sent to the wireless communications system at which the radio signal processing apparatus is located, and also include a radio signal sent to another device; therefore, a radio signal received by the antenna may be a radio signal sent to the radio signal processing apparatus, or may be a radio signal sent to another device. To process a received radio signal, the acquiring module 201 needs to acquire at least one radio signal received by the antenna of the wireless communications system thereof. The acquiring module 201 may acquire, in many manners, at least one radio signal received by the antenna of the wireless communications system thereof, and during specific implementation, after the antenna receives a radio signal, the radio signal received by the antenna is directly used as an acquired radio signal.

It should be noted that, a radio signal acquired by the acquiring module 201 may be a radio signal sent to the radio signal processing apparatus, or may be a radio signal sent to another device; therefore, in this embodiment and subsequent embodiments of the present invention, if a radio signal that is being currently processed is a radio signal sent to the radio signal processing apparatus, it is considered that the radio signal carries a data packet that needs to be processed; or if a radio signal that is being currently processed is not a radio signal sent to the radio signal processing apparatus, it is considered that the radio signal does not carry a data packet that needs to be processed.

Further, to determine whether the at least one radio signal acquired by the acquiring module 201 needs to be sent to the energy collection module 204 to perform processing, or sent to the information processing module 203 to perform processing, the radio signal processing apparatus further includes the preprocessing module 202. The preprocessing module 202 is configured to determine whether a radio signal that is being currently processed carries a data packet that needs to be processed, and determine, according to whether the radio signal that is being currently processed carries the data packet that needs to be processed, whether the acquired at least one radio signal is sent to the energy collection module 204 to perform processing, or sent to the information processing module 203 to perform processing.

Specifically, if the preprocessing module 202 determines that the radio signal that is being currently processed carries the data packet that needs to be processed, that is, a radio signal that is being currently processed is a radio signal sent to the radio signal processing apparatus, the preprocessing module 202 sends the radio signal that is being currently processed to the information processing module 203 to perform processing. If the preprocessing module 202 determines that the radio signal that is being currently processed does not carry the data packet that needs to be processed, that is, a radio signal that is being currently processed is not a radio signal sent to the radio signal processing apparatus, the preprocessing module 202 sends the radio signal that is being currently processed to the energy collection module 204 to perform processing.

The preprocessing module 202 may determine, in many manners, whether the radio signal that is being currently processed carries the data packet that needs to be processed, and during specific implementation, the manners include, but are not limited to, the following manners:

First manner: The preprocessing module 202 may acquire a signal property of the radio signal that is being currently processed, and determine, according to the signal property of the radio signal that is being currently processed, whether the radio signal that is being currently processed carries the data packet that needs to be processed. In this case, the preprocessing module 202 may include a first acquiring unit and a first determining unit. The first acquiring unit is configured to acquire the signal property of the radio signal that is being currently processed, and the first determining unit is configured to determine, according to the signal property of the radio signal that is being currently processed, whether the radio signal that is being currently processed carries the data packet that needs to be processed.

Specific content of the signal property is not limited in this embodiment of the present invention. During specific implementation, because an operating channel of each wireless communications system has a specific center frequency, the wireless communications system processes a received radio signal that matches the center frequency of the operating channel. Therefore, the signal property includes, but is not limited to, the center frequency of the signal. In this case, the first acquiring unit is configured to acquire the center frequency of the radio signal that is being currently processed, and the first determining unit is configured to perform matching between the center frequency of the radio signal that is being currently processed and the center frequency of the operating channel of the wireless communications system thereof; and if the center frequency of the radio signal that is being currently processed is consistent with the center frequency of the operating channel of the wireless communications system thereof, determine that the radio signal that is being currently processed carries the data packet that needs to be processed; or if the center frequency of the radio signal that is being currently processed is inconsistent with the center frequency of the operating channel of the wireless communications system thereof, determine that the radio signal that is being currently processed does not carry the data packet that needs to be processed.

The first acquiring unit may acquire, in many manners, the center frequency of the radio signal that is being currently processed, and during specific implementation, the first acquiring unit may determine, by using a filter, the center frequency of the radio signal that is being currently processed, and use a center frequency, determined by using the filter, of the radio signal that is being currently processed as the acquired center frequency of the radio signal that is being currently processed. A manner in which the first determining unit performs matching between the center frequency of the radio signal that is being currently processed and the center frequency of the operating channel of the wireless communications system thereof is not specifically limited in this embodiment of the present invention. During specific implementation, the first determining unit may pre-store the center frequency of the operating channel of the wireless communications system thereof, after acquiring the center frequency of the radio signal that is being currently processed, the first acquiring unit sends the center frequency to the first determining unit, and the first determining unit acquires the pre-stored center frequency of the operating channel of the wireless communications system thereof, and performs matching between the received center frequency of the radio signal that is being currently processed and the acquired center frequency of the operating channel of the wireless communications system thereof.

In addition, when acquiring, by using a filter, the center frequency of the radio signal that is being currently processed, the first acquiring unit may further set a center frequency of the filter to be consistent with the center frequency of the operating channel of the wireless communications system thereof. In this case, the first determining unit may determine, by determining whether the radio signal that is being currently processed is filtered out by the filter, whether the radio signal that is being currently processed carries the data packet that needs to be processed. Specifically, if the radio signal that is being currently processed is filtered out by the filter, it is determined that the center frequency of the radio signal that is being currently processed is inconsistent with the center frequency of the filter, that is, it is determined that the radio signal that is being currently processed does not carry the data packet that needs to be processed; or if the radio signal that is being currently processed passes through the filter, it is determined that the radio signal that is being currently processed carries the data packet that needs to be processed.

Second manner: If the wireless communications system at which the radio signal processing apparatus is located is a schedulable wireless communications system, the wireless communications system usually includes the wireless transceiver scheduling and management module. The wireless transceiver scheduling and management module may acquire input feedback information of radio signal receiving and sending, and whether the radio signal that is being currently processed carries the data packet that needs to be processed may be determined according to the input feedback information. For example, the wireless transceiver scheduling and management module may acquire a time at which a radio signal that carries the data packet that needs to be processed is sent, a time at which a signal is input, whether indication information exists in a received radio signal, and the like, and all the information may be used as input feedback information of the radio signal processing apparatus. The wireless communications system at which the radio signal processing apparatus provided in this embodiment of the present invention is located is a schedulable wireless communications system, that is, the radio signal processing apparatus provided in this embodiment of the present invention includes the wireless transceiver scheduling and management module 207.

In this embodiment of the present invention, the wireless transceiver scheduling and management module 207 may include an acquiring unit configured to acquire input feedback information in the wireless communications system, and a sending unit configured to send the input feedback information to the preprocessing module 202. That is, the wireless transceiver scheduling and management module 207 may feed back, to the preprocessing module 202, input feedback information related to the preprocessing module 202. Therefore, the preprocessing module 202 may acquire, by interacting with the wireless transceiver scheduling and management module 207, input feedback information sent by the wireless transceiver scheduling and management module 207, and determine, according to the input feedback information, whether the radio signal that is being currently processed carries the data packet that needs to be processed. The acquiring unit in the wireless transceiver scheduling and management module 207 may acquire the input feedback information in different acquiring manners with reference to different content of the input feedback information, and this part of content is described below.

Specific content of the input feedback information is not specifically limited in this embodiment of the present invention. During specific implementation, the input feedback information may include a moment at which a radio signal that carries the data packet that needs to be processed is input. Specifically, for a schedulable wireless communications system, the wireless transceiver scheduling and management module 207 can accurately obtain a time at which a current node needs to send data, and determine, by interacting by means of an air interface, and a time at which a communication peer node needs to send data to the current node. Therefore, for the radio signal that carries the data packet that needs to be processed, the wireless transceiver scheduling and management module 207 can accurately determine, by interacting by means of an air interface, the moment at which the radio signal that carries the data packet that needs to be processed is input. The moment, determined by the wireless transceiver scheduling and management module 207, at which the radio signal that carries the data packet that needs to be processed is input may be a moment at which the communication peer node sends, to the current node, the radio signal that carries the data packet that needs to be processed, or may be a moment at which the current node receives the radio signal that is sent by the communication peer node and that carries the data packet that needs to be processed.

In conclusion, because the wireless transceiver scheduling and management module 207 can accurately determine the moment at which the radio signal that carries the data packet that needs to be processed is input, the wireless transceiver scheduling and management module 207 may generate, according to the moment at which the radio signal that carries the data packet that needs to be processed is input, input feedback information that includes the moment at which the radio signal that carries the data packet that needs to be processed is input. In this case, a second acquiring unit is configured to acquire the moment at which the radio signal that carries the data packet that needs to be processed is input, and a second determining unit is configured to determine a moment at which the radio signal that is being currently processed is received; perform matching between the moment at which the radio signal that is being currently processed is received and the moment at which the radio signal that carries the data packet that needs to be processed is input; and if the moment at which the radio signal that is being currently processed is received matches the moment at which the radio signal that carries the data packet that needs to be processed is input, determine that the radio signal that is being currently processed carries the data packet that needs to be processed; or if the moment at which the radio signal that is being currently processed is received does not match the moment at which the radio signal that carries the data packet that needs to be processed is input, determine that the radio signal that is being currently processed does not carry the data packet that needs to be processed.

A manner in which the second determining unit determines the moment at which the radio signal that is being currently processed is received is not specifically limited in this embodiment of the present invention. For a manner of performing matching between the moment at which the radio signal that is being currently processed is received and the moment at which the radio signal that carries the data packet that needs to be processed is input, there may be different matching manners with reference to specific content of the moment at which the radio signal that carries the data packet that needs to be processed is input. For specific details, refer to the following two manners:

Manner 1: If the moment, determined by the wireless transceiver scheduling and management module 207, at which the radio signal that carries the data packet that needs to be processed is input is a moment at which the current node receives the radio signal that is sent by the communication peer node and that carries the data packet that needs to be processed, when performing matching between the moment at which the radio signal that is being currently processed is received and the moment at which the radio signal that carries the data packet that needs to be processed is input, the second determining module directly performs matching between the moment at which the radio signal that is being currently processed is received and the moment, determined by the wireless transceiver scheduling and management module 207, at which the radio signal that carries the data packet that needs to be processed is input. When the two are consistent, it is determined that the radio signal that is being currently processed carries the data packet that needs to be processed, or when the two are inconsistent, it is determined that the radio signal that is being currently processed does not carry the data packet that needs to be processed.

For example, if the moment, determined by the wireless transceiver scheduling and management module 207, at which the radio signal that carries the data packet that needs to be processed is input is a moment at which the current node receives the radio signal that is sent by the communication peer node and that carries the data packet that needs to be processed, the moment is 09:12:53, and the moment at which the radio signal that is being currently processed is received is also 09:12:53, it is determined that the radio signal that is being currently processed carries the data packet that needs to be processed.

Manner 2: If the moment, determined by the wireless transceiver scheduling and management module 207, at which the radio signal that carries the data packet that needs to be processed is input is a moment at which the communication peer node sends, to the current node, the radio signal that carries the data packet that needs to be processed, when performing matching between the moment at which the radio signal that is being currently processed is received and the moment at which the radio signal that carries the data packet that needs to be processed is input, the second determining module needs to add, to the moment, determined by the scheduling and management module 207, at which the radio signal that carries the data packet that needs to be processed is input, a time for which the radio signal that is sent by the communication peer node and that carries the data packet that needs to be processed is propagated to the current node in space. That is, matching is performed between the moment at which the radio signal that is being currently processed is received and a sum of the moment, determined by the scheduling and management module 207, at which the radio signal that carries the data packet that needs to be processed is input and the time for which the radio signal that is sent by the communication peer node and that carries the data packet that needs to be processed is propagated to the current node in space; and when the two are consistent, it is determined that the radio signal that is being currently processed carries the data packet that needs to be processed, or when the two are inconsistent, it is determined that the radio signal that is being currently processed does not carry the data packet that needs to be processed.

For example, if the moment, determined by the wireless transceiver scheduling and management module 207, at which the radio signal that carries the data packet that needs to be processed is input is a moment at which the communication peer node sends the radio signal that carries the data packet that needs to be processed, and the moment at which the communication peer node sends the radio signal that carries the data packet that needs to be processed is 09:12:53, if the time for which the radio signal that is sent by the communication peer node and that carries the data packet that needs to be processed is propagated to the current node in space is 2 s (second), and the moment at which the radio signal that is being currently processed is received is 09:12:54, because the two are inconsistent, it is determined that the radio signal that is being currently processed does not carry the data packet that needs to be processed. If the moment at which the radio signal that is being currently processed is received is 09:12:55, because the moment at which the radio signal that is being currently processed is received is consistent with a sum of the moment, determined by the management scheduling and management module 207, at which the radio signal that carries the data packet that needs to be processed is input and the time for which the radio signal that is sent by the communication peer node and that carries the data packet that needs to be processed is propagated to the current node in space, it is determined that the radio signal that is being currently processed carries the data packet that needs to be processed.

In addition, in the wireless communications system, indication information that indicates whether a next data packet exists usually exists in a data packet carried in a radio signal, and the indication information may be obtained by preprocessing the acquired radio signal by the information processing module 203. When preprocessing the acquired radio signal and determining indication information that is in the radio signal and that indicates that a next radio signal that carries the data packet that needs to be processed exists, the information processing module 203 may send the indication information to the wireless transceiver scheduling and management module 207, and the wireless transceiver scheduling and management module 207 sends the indication information to the preprocessing module 202. Therefore, the acquiring unit in the wireless transceiver scheduling and management module 207 may be further configured to acquire, from the information processing module 203, the indication information of the previous signal of the radio signal that is being currently processed, and obtain, by using the indication information of the previous signal of the radio signal that is being currently processed as the input feedback information, the input feedback information that includes the indication information of the previous signal of the radio signal that is being currently processed. In this case, the second acquiring unit is configured to acquire the indication information of the previous signal of the radio signal that is being currently processed, and the second determining unit is configured to: determine whether the indication information of the previous signal of the radio signal that is being currently processed indicates that a next radio signal that carries the data packet that needs to be processed exists; and when the indication information of the previous signal of the radio signal that is being currently processed indicates that the next radio signal that carries the data packet that needs to be processed exists, determine that the radio signal that is being currently processed carries the data packet that needs to be processed, or when the indication information of the previous signal of the radio signal that is being currently processed does not indicate that the next radio signal that carries the data packet that needs to be processed exists, determine that the radio signal that is being currently processed does not carry the data packet that needs to be processed. The indication information of the previous signal may be indicated by using one or more bits (bit) in a frame of the previous signal.

Third manner: Before a radio signal is received, at least two antennas may be preset for the radio signal processing apparatus to receive a radio signal. An antenna is configured to receive a radio signal that carries a data packet that needs to be processed, and another antenna is configured to receive a radio signal that does not carry a data packet that needs to be processed. Therefore, when determining whether the radio signal that is being currently processed carries the data packet that needs to be processed, the preprocessing module 202 may perform implementation by determining an antenna that receives the radio signal that is being currently processed, and determining whether the antenna that receives the radio signal that is being currently processed is a preset antenna configured to receive a radio signal that carries the data packet that needs to be processed. In this case, the preprocessing module 202 may include: a third determining unit, configured to determine an antenna that receives the radio signal that is being currently processed, a fourth determining unit, configured to determine whether the antenna that receives the radio signal that is being currently processed is a preset antenna configured to receive a radio signal that carries the data packet that needs to be processed, and a fifth determining unit, configured to: when it is determined that the antenna that receives the radio signal that is being currently processed is the preset antenna configured to receive the radio signal that carries the data packet that needs to be processed, determine that the radio signal that is being currently processed carries the data packet that needs to be processed, or when it is determined that the antenna that receives the radio signal that is being currently processed is not a preset antenna configured to receive a radio signal that carries the data packet that needs to be processed, determine that the radio signal that is being currently processed does not carry the data packet that needs to be processed.

A manner of presetting, for the signal processing apparatus, an antenna configured to receive a radio signal that carries a data packet that needs to be processed is not specifically limited in this embodiment of the present invention. During specific implementation, the manner includes, but is not limited to: adjusting, to be consistent with the center frequency of the operating channel of the wireless communications system thereof, a receive frequency of a preset antenna configured to receive a radio signal that carries a data packet that needs to be processed. In this case, a radio signal received by the antenna is a radio signal that carries a data packet that needs to be processed.

Further, because various radio signals exist around an antenna, signals received by the antenna may include a radio signal sent to the wireless communications system thereof, and may also include a radio signal sent to another wireless communications system. Moreover, different wireless communications systems usually correspond to different signal formats, and therefore, to determine whether the radio signal that is being currently processed is a radio signal of the wireless communications system thereof, the radio signal processing apparatus may further include the parsing module 208. The parsing module 208 is configured to parse the radio signal that is being currently processed, and obtain, according to a parsing result, a signal format of the radio signal that is being currently processed, so that the preprocessing module 202 may determine, according to the signal format of the radio signal that is being currently processed, whether the radio signal that is being currently processed is a radio signal of the wireless communications system thereof, and when determining that the radio signal that is being currently processed is a radio signal of the wireless communications system thereof, the preprocessing module 202 determines whether the radio signal that is being currently processed carries the data packet that needs to be processed.

A manner in which the parsing module 208 parses the radio signal that is being currently processed is not specifically limited in this embodiment of the present invention. Because a signal format of a radio signal is usually carried in a preamble header of the radio signal, the parsing module 208 may parse the radio signal that is being currently processed, so as to obtain a preamble header of the radio signal that is being currently processed, and obtain the signal format of the radio signal from the preamble header. A signal format of a radio signal is not specifically limited in this embodiment of the present invention. A manner in which the preprocessing module 202 determines, according to the signal format of the radio signal that is being currently processed, whether the radio signal that is being currently processed is a radio signal of the wireless communications system thereof is not specifically limited in this embodiment of the present invention. During specific implementation, because a signal format of a radio signal may include a waveform of the signal and the like, the preprocessing module 202 may determine, by using a signal waveform parsed out by the parsing module 208, whether the radio signal that is being currently processed is a radio signal of the wireless communications system thereof.

The radio signal that is being currently processed is parsed to obtain the signal format of the radio signal that is being currently processed, so that for a radio signal of the wireless communications system thereof, the preprocessing module 202 may perform a step of determining whether the radio signal that is being currently processed carries the data packet that needs to be processed, and for a radio signal of another wireless communications system, the preprocessing module 202 does not perform a step of determining whether the radio signal that is being currently processed carries the data packet that needs to be processed, thereby saving a resource of the preprocessing module 202.

If determining that the radio signal that is being currently processed carries the data packet that needs to be processed, the preprocessing module 202 sends, to the information processing module 203, the radio signal that is being currently processed. The information processing module 203 extracts communication information carried in the data packet carried in the radio signal that is being currently processed.

A manner in which the information processing module 203 extracts communication information carried in the data packet carried in the radio signal that is being currently processed is not specifically limited in this embodiment of the present invention. During specific implementation, after receiving the radio signal that is being currently processed, the information processing module 203 may perform A/D (Analog/Digital, analog to digital) conversion on the radio signal that is being currently processed, and demodulate the radio signal that is being currently processed, to obtain the communication information carried in the data packet carried in the radio signal that is being currently processed.

If determining that the radio signal that is being currently processed does not carry the data packet that needs to be processed, the preprocessing module 202 sends, to the energy collection module 204, the radio signal that is being currently processed. The energy collection module 204 collects energy of the radio signal that is being currently processed.

A manner in which the energy collection module 204 collects energy of the radio signal that is being currently processed is not specifically limited in this embodiment of the present invention. During specific implementation, the energy collection module 204 may convert AC (Alternating Current) corresponding to the radio signal into DC (Direct Current), and further convert unstable DC into stable DC.

After collecting energy of the acquired radio signal, the energy collection module 204 may use the collected energy to perform wireless charging on the radio signal processing apparatus. By means of wireless charging, the radio signal processing apparatus is no longer constrained by wired charging, and therefore, charging becomes simple and efficient.

Optionally, to store energy collected by the energy collection module 204, the radio signal processing apparatus may further include the electric energy storage module 205, configured to store electric energy collected by the energy collection module 204, and provide electric energy to other modules in the signal processing apparatus.

A manner in which the electric energy storage module 205 stores electric energy collected by the energy collection module 204 is not specifically limited in this embodiment of the present invention. In addition, after storing electric energy, the electric energy storage module 205 may provide electric energy to other modules in the signal processing apparatus. For example, the electric energy storage module 205 may supply power to the information processing module 203, so that the information processing module 203 processes the radio signal that carries the data packet that needs to be processed.

Further, to know in real time information about a quantity of electricity stored in the electric energy storage module 205, the radio signal processing apparatus may further include the battery management module 206. The battery management module 206 is configured to monitor the information about the quantity of electricity of the electric energy storage module 205, and feed back the information about the quantity of electricity to the preprocessing module 202, so that after obtaining the information about the quantity of electricity, the preprocessing module 202 may further control working of the energy collection module 204 and the information processing module 203.

For example, if the battery management module 206 feeds back to the preprocessing module 202 that the information about the quantity of electricity stored in the electric energy storage module 205 indicates insufficiency, the preprocessing module 202 may control to strengthen working intensity of the energy collection module 204, so as to collect more radio signals; or if the battery management module 206 feeds back to the preprocessing module 202 that the information about the quantity of electricity stored in the electric energy storage module 205 indicates abundance, the preprocessing module 202 may control to weaken working intensity of the energy collection module 204.

It should be noted that, when at least two antennas are allocated to the signal processing apparatus to receive a radio signal, energy collected by an antenna configured to receive a radio signal that does not carry a data packet that needs to be processed may be directly used to supply power to the information processing module. In this case, the electric energy storage module 205 and the battery management module 206 no longer need to be disposed, and therefore, a requirement on a configuration of the radio signal processing apparatus can be reduced.

Optionally, to control in real time intensity of receiving a signal by an antenna, and adjust a gain value of an antenna in real time, the radio signal processing apparatus may further include the gain adjustment module 209. The gain adjustment module 209 is configured to: when the radio signal that is being currently processed carries the data packet that needs to be processed, reduce a gain value of an antenna that receives the radio signal that is being currently processed, or when the radio signal that is being currently processed does not carry the data packet that needs to be processed, increase a gain value of an antenna that receives the radio signal that is being currently processed.

Specifically, if the radio signal that is being currently processed does not carry the data packet that needs to be processed, to ensure that radio signals in space can be received to the maximum extent, so as to ensure that more energy can be collected, the gain adjustment module 209 may increase a gain value of an antenna that receives the radio signal that is being currently processed. If the radio signal that is being currently processed carries the data packet that needs to be processed, the gain adjustment module 209 may properly reduce a gain value of an antenna that receives the radio signal that is being currently processed, to achieve an objective of energy conservation.

According to the apparatus provided in this embodiment of the present invention, the preprocessing module determines whether a radio signal that is being currently processed carries a data packet that needs to be processed, and the radio signal that is being currently processed is allocated to the information processing module or the energy collection module according to a determining result, to perform processing. This not only can avoid wasting resources because the received radio signal that is being currently processed is a radio signal that is not used for communication or that is not used for wireless charging and the radio signal that is being currently processed is discarded, but also can fully use a received radio signal, thereby improving usage of using a received radio signal. In addition, after a radio signal that is being currently processed is received, the radio signal that is being currently processed is processed regardless of whether the radio signal that is being currently processed carries a data packet that needs to be processed; therefore, it is avoided that system resource waste is caused because the radio signal that is being currently processed is received, and therefore, radio signal processing efficiency can be improved.

Figure 6:
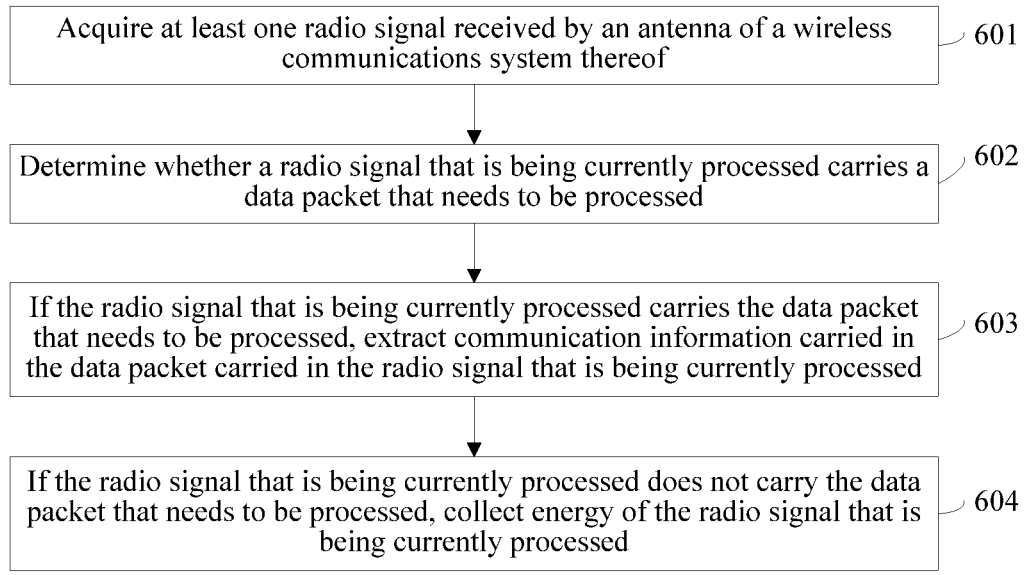
FIG. 6 is a flowchart of a radio signal processing method according to another embodiment of the present invention.

With reference to the schematic diagram of the implementation environment shown in FIG. 1, FIG. 6 provides a flowchart of a radio signal processing method according to an exemplary embodiment, where the method is applied to the radio signal processing apparatuses provided in the embodiments corresponding to FIG. 2 to FIG. 5. Referring to FIG. 6, a procedure of the method provided in this embodiment of the present invention includes:

601. Acquire at least one radio signal received by an antenna of a wireless communications system thereof.

602. Determine whether a radio signal that is being currently processed carries a data packet that needs to be processed.

603. If the radio signal that is being currently processed carries the data packet that needs to be processed, extract communication information carried in the data packet carried in the radio signal that is being currently processed.

604. If the radio signal that is being currently processed does not carry the data packet that needs to be processed, collect energy of the radio signal that is being currently processed.

According to the method provided in this embodiment of the present invention, it is determined whether a radio signal that is being currently processed carries a data packet that needs to be processed, and consequently information processing or energy collection is performed, according to a determining result, on the radio signal that is being currently processed. This not only can avoid wasting resources because the received radio signal that is being currently processed is a radio signal that is not used for communication or that is not used for wireless charging and the radio signal that is being currently processed is discarded, but also can fully use a received radio signal, thereby improving usage of using a received radio signal. In addition, after a radio signal that is being currently processed is received, the radio signal that is being currently processed is processed regardless of whether the radio signal that is being currently processed carries a data packet that needs to be processed; therefore, it is avoided that system resource waste is caused because the radio signal that is being currently processed is received, and therefore, radio signal processing efficiency can be improved.

Figure 7:
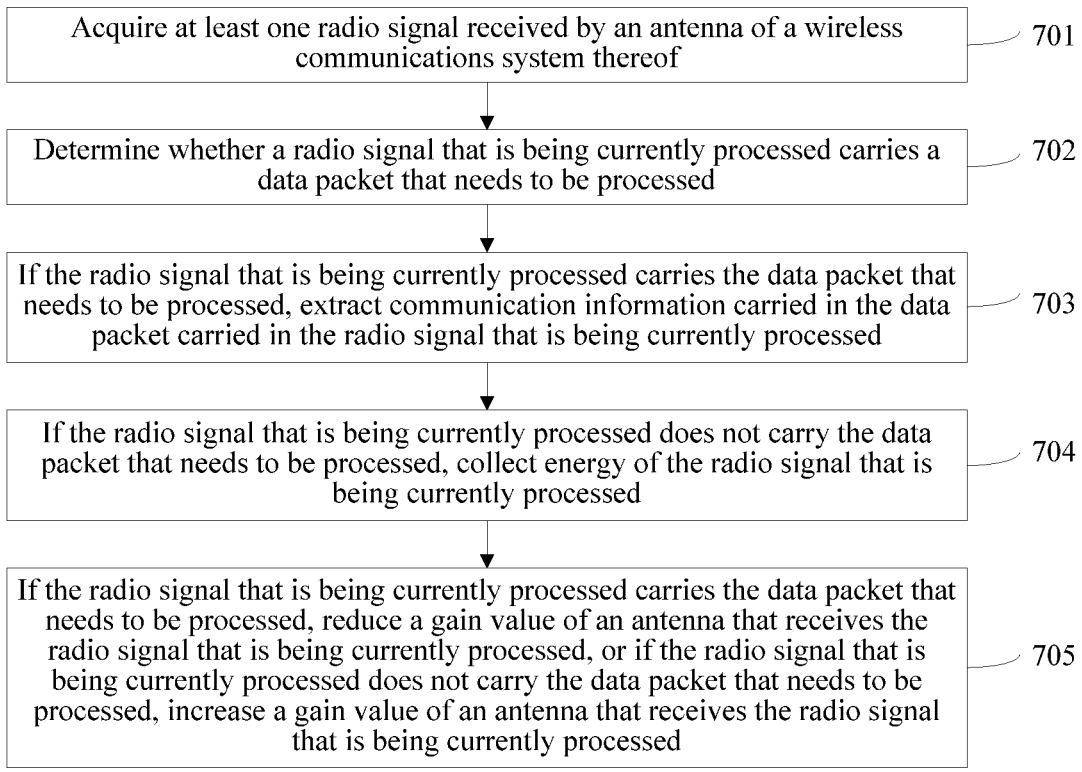
FIG. 7 is a flowchart of a radio signal processing method according to another embodiment of the present invention.

With reference to the implementation environment shown in FIG. 1, FIG. 7 provides a flowchart of a radio signal processing method according to an exemplary embodiment, where the method is applied to the radio signal processing apparatuses provided in the embodiments corresponding to FIG. 2 to FIG. 5. Referring to FIG. 7, a procedure of the method provided in this embodiment of the present invention includes:

701. Acquire at least one radio signal received by an antenna of a wireless communications system thereof.

To implement processing on a radio signal, one or more antennas configured to receive and send a radio signal are usually disposed at a wireless communications system thereof. Further, various radio signals exist in space around an antenna, the antenna may receive many radio signals, and the signals may include a radio signal sent to the antenna, and may also include a radio signal sent to another device; therefore, to process a received radio signal, at least one radio signal received by the antenna of the wireless communications system thereof needs to be acquired.

At least one radio signal received by the antenna of the wireless communications system thereof may be acquired in many manners, and during specific implementation, after the antenna receives a radio signal, the radio signal received by the antenna is directly used as an acquired radio signal.

702. Determine whether a radio signal that is being currently processed carries a data packet that needs to be processed.

In this embodiment of the present invention, for ease of description, if a radio signal that is being currently processed is a signal sent to the antenna, it is determined that the radio signal that is being currently processed carries a data packet that needs to be processed; or if a radio signal that is being currently processed is not a signal sent to the antenna, it is determined that the radio signal that is being currently processed does not carry a data packet that needs to be processed. In this embodiment of the present invention, a radio signal that carries a data packet that needs to be processed and a radio signal that does not carry a data packet that needs to be processed are processed in different manners; therefore, it needs to be determined whether a radio signal that is being currently processed carries a data packet that needs to be processed.

It may be determined, in many manners, whether the radio signal that is being currently processed carries the data packet that needs to be processed, and during specific implementation, the manners may include, but are not limited to, the following manners:

First manner: A signal property of the radio signal that is being currently processed is acquired, and it is determined, according to the signal property of the radio signal that is being currently processed, whether the radio signal that is being currently processed carries the data packet that needs to be processed.

Specific content of the signal property is not limited in this embodiment of the present invention. During specific implementation, because an operating channel of each wireless communications system has a specific center frequency, the device processes a received radio signal that matches the center frequency of the operating channel of the wireless communications system thereof. Therefore, the signal property includes, but is not limited to, the center frequency of the signal. On this basis, a manner of determining whether the radio signal that is being currently processed carries the data packet that needs to be processed includes, but is not limited to: acquiring a center frequency of the radio signal that is being currently processed; performing matching between the center frequency of the radio signal that is being currently processed and a center frequency of an operating channel of the wireless communications system thereof, to perform implementation. If the center frequency of the radio signal that is being currently processed is consistent with the center frequency of the operating channel of the wireless communications system thereof, it is determined that the radio signal that is being currently processed carries the data packet that needs to be processed; or if the center frequency of the radio signal that is being currently processed is inconsistent with the center frequency of the operating channel of the wireless communications system thereof, it is determined that the radio signal that is being currently processed does not carry the data packet that needs to be processed.

The center frequency of the radio signal that is being currently processed may be acquired in many manners, and during specific implementation, the center frequency of the radio signal that is being currently processed may be determined by using a filter, and a center frequency, determined by using the filter, of the radio signal that is being currently processed is used as the acquired center frequency of the radio signal that is being currently processed. A manner of performing matching between the center frequency of the radio signal that is being currently processed and the center frequency of the operating channel of the wireless communications system thereof is not specifically limited in this embodiment of the present invention. During specific implementation, the center frequency of the operating channel of the wireless communications system thereof may be pre-stored. Therefore, after the center frequency of the radio signal that is being currently processed is acquired, the pre-stored center frequency of the operating channel of the wireless communications system thereof may be acquired sequentially, and matching is performed between the center frequency of the radio signal that is being currently processed and the center frequency of the operating channel of the wireless communications system thereof.

In addition, when the center frequency of the radio signal that is being currently processed is acquired by using a filter, a center frequency of the filter may be further set to be consistent with the center frequency of the operating channel of the wireless communications system thereof. Therefore, it may be determined, by determining whether the radio signal that is being currently processed is filtered out by the filter, whether the radio signal that is being currently processed carries the data packet that needs to be processed. If the radio signal that is being currently processed is filtered out by the filter, it is determined that the center frequency of the radio signal that is being currently processed is inconsistent with the center frequency of the filter, that is, it is determined that the radio signal that is being currently processed does not carry the data packet that needs to be processed; or if the radio signal that is being currently processed passes through the filter, it is determined that the radio signal that is being currently processed carries the data packet that needs to be processed.

Second manner: If the wireless communications system thereof is a schedulable wireless communications system, the wireless communications system may perform management and scheduling on content such as a time at which a signal is received and sent, and consequently a current node can accurately acquire a time at which a radio signal that carries the data packet that needs to be processed is sent, whether indication information exists in a sent radio signal, and the like, and all the information may be used as input feedback information. Because information such as a moment at which a radio signal that carries a data packet that needs to be processed is sent, and a moment at which a radio signal that carries a data packet that needs to be processed is received can be determined by using the input feedback information, it may be determined, by acquiring input feedback information of the wireless communications system thereof, whether the radio signal that is being currently processed carries the data packet that needs to be processed.

Specific content of the input feedback information is not specifically limited in this embodiment of the present invention. When specific content of the input feedback information is different, it is determined, also in different manners according to the input feedback information, whether the radio signal that is being currently processed carries the data packet that needs to be processed. Specifically, for a schedulable wireless communications system, a current node can accurately obtain a time at which the current node needs to send data, and determine, by interacting by means of an air interface, a time at which a communication peer node needs to send data to the current node. Therefore, for the radio signal that carries the data packet that needs to be processed, the current node can accurately determine, by interacting by means of an air interface, the moment at which the radio signal that carries the data packet that needs to be processed is input.

The moment, determined by the current node, at which the radio signal that carries the data packet that needs to be processed is input may be a moment at which the communication peer node sends, to the current node, the radio signal that carries the data packet that needs to be processed, or may be a moment at which the current node receives the radio signal that is sent by the communication peer node and that carries the data packet that needs to be processed. Therefore, the input feedback information includes, but is not limited to, a moment at which a radio signal that carries the data packet that needs to be processed is input.

When the input feedback information includes the moment at which the radio signal that carries the data packet that needs to be processed is input, the current node may generate, according to the determined moment at which the radio signal that carries the data packet that needs to be processed is input, input feedback information that includes the moment at which the radio signal that carries the data packet that needs to be processed is input. On this basis, the moment at which the radio signal that carries the data packet that needs to be processed is input may be acquired, and a moment at which the radio signal that is being currently processed is received may be determined, so that matching is performed between the moment at which the radio signal that is being currently processed is received and the moment at which the radio signal that carries the data packet that needs to be processed is input. If the moment at which the radio signal that is being currently processed is received matches the moment at which the radio signal that carries the data packet that needs to be processed is input, it is determined that the radio signal that is being currently processed carries the data packet that needs to be processed; or if the moment at which the radio signal that is being currently processed is received does not match the moment at which the radio signal that carries the data packet that needs to be processed is input, it is determined that the radio signal that is being currently processed does not carry the data packet that needs to be processed.

For a manner of determining the moment at which the radio signal that is being currently processed is received, and a manner of performing matching between the moment at which the radio signal that is being currently processed is received and the moment at which the radio signal that carries the data packet that needs to be processed is input, reference may be made to the specific implementation manner in the embodiment corresponding to FIG. 5, and details are not described herein again.

In addition, in a schedulable wireless communications system, indication information that indicates whether a next data packet exists usually exists in a data packet carried in a radio signal. Therefore, when it is determined whether the radio signal that is being currently processed carries the data packet that needs to be processed, a previous signal of the radio signal that is being currently processed may be processed to acquire indication information of the previous signal of the radio signal that is being currently processed. In this case, the input feedback information may be further the indication information of the previous signal of the radio signal that is being currently processed. In this case, when it is determined whether the radio signal that is being currently processed carries the data packet that needs to be processed, the indication information of the previous signal of the radio signal that is being currently processed may be acquired, and it is determined whether the indication information of the previous signal of the radio signal that is being currently processed indicates that a next radio signal that carries the data packet that needs to be processed exists. If the indication information of the previous signal of the radio signal that is being currently processed indicates that the next radio signal that carries the data packet that needs to be processed exists, it is determined that the radio signal that is being currently processed carries the data packet that needs to be processed; or if the indication information of the previous signal of the radio signal that is being currently processed does not indicate that the next radio signal that carries the data packet that needs to be processed exists, it is determined that the radio signal that is being currently processed does not carry the data packet that needs to be processed.

Third manner: Before a radio signal is received, at least two antennas may be preset in the wireless communications system thereof to receive a radio signal. An antenna is configured to receive a radio signal that carries a data packet that needs to be processed, and another antenna is configured to receive a radio signal that does not carry a data packet that needs to be processed. Therefore, when it is determined whether the radio signal that is being currently processed carries the data packet that needs to be processed, implementation may be performed by determining an antenna that receives the radio signal that is being currently processed, and determining whether the antenna that receives the radio signal that is being currently processed is a preset antenna configured to receive a radio signal that carries the data packet that needs to be processed. If it is determined that the antenna that receives the radio signal that is being currently processed is a preset antenna configured to receive a radio signal that carries the data packet that needs to be processed, it is determined that the radio signal that is being currently processed carries the data packet that needs to be processed, or if it is determined that the antenna that receives the radio signal that is being currently processed is not a preset antenna configured to receive a radio signal that carries the data packet that needs to be processed, it is determined that the radio signal that is being currently processed does not carry the data packet that needs to be processed.

A manner of presetting an antenna that receives a radio signal that carries a data packet that needs to be processed includes, but is not limited to: adjusting, to be consistent with the center frequency of the operating channel of the wireless communications system thereof, a receive frequency of an antenna that receives a radio signal that carries a data packet that needs to be processed. In this case, a radio signal received by the antenna is a radio signal that carries a data packet that needs to be processed.

Further, because various radio signals exist around an antenna, signals received by the antenna may include a radio signal sent to the wireless communications system thereof, and may also include a radio signal sent to another wireless communications system. Moreover, different wireless communications systems correspond to different signal formats, and therefore, to determine whether the radio signal that is being currently processed is a radio signal sent to the wireless communications system thereof, before it is determined whether the radio signal that is being currently processed carries the data packet that needs to be processed, the radio signal that is being currently processed may be further parsed, and a signal format of the radio signal that is being currently processed may be obtained according to a parsing result, so that it may be determined, according to the signal format of the radio signal that is being currently processed, whether the radio signal that is being currently processed is a radio signal of the wireless communications system thereof. If it is determined that the radio signal that is being currently processed is a radio signal of the wireless communications system thereof, the step of determining whether the radio signal that is being currently processed carries the data packet that needs to be processed is performed.

A manner of parsing the radio signal that is being currently processed is not specifically limited in this embodiment of the present invention. Because a signal format of a radio signal is usually carried in a preamble header of the radio signal, the radio signal that is being currently processed may be parsed, to obtain a preamble header of the radio signal that is being currently processed, and obtain the signal format of the radio signal from the preamble header. A signal format of a radio signal is not specifically limited in this embodiment of the present invention.

It may be determined, in many manners according to the signal format of the radio signal that is being currently processed, whether the radio signal that is being currently processed is a radio signal of the wireless communications system thereof. During specific implementation, because a signal format of a radio signal may include a waveform of the signal and the like, it may be determined, by using a signal waveform parsed out, whether the radio signal that is being currently processed is a radio signal of the wireless communications system thereof.

The radio signal that is being currently processed is parsed to obtain the signal format of the radio signal that is being currently processed, and it is ensured that, for a radio signal of the wireless communications system thereof, a step of determining whether the radio signal that is being currently processed carries the data packet that needs to be processed may be performed, and for a radio signal of another wireless communications system, a step of determining whether the radio signal that is being currently processed carries the data packet that needs to be processed is not performed, thereby saving a system resource.

703. If the radio signal that is being currently processed carries the data packet that needs to be processed, extract communication information carried in the data packet carried in the radio signal that is being currently processed.

A manner of extracting communication information carried in the data packet carried in the radio signal that is being currently processed is not specifically limited in this embodiment of the present invention. During specific implementation, after receiving the radio signal that is being currently processed, A/D (Analog/Digital, analog to digital) conversion may be performed on the radio signal that is being currently processed, and the radio signal that is being currently processed may be modulated to obtain the communication information carried in the data packet carried in the radio signal that is being currently processed.

704. If the radio signal that is being currently processed does not carry the data packet that needs to be processed, collect energy of the radio signal that is being currently processed.

A manner of collecting energy of the radio signal that is being currently processed is not specifically limited in this embodiment of the present invention. During specific implementation, AC (Alternating Current, alternating current) corresponding to the radio signal may be converted into DC (Direct Current, direct current), and unstable DC may be further converted into stable DC.

After energy of the acquired radio signal is collected, the collected energy may be used to perform wireless charging on a radio signal processing apparatus. By means of wireless charging, the radio signal processing apparatus is no longer constrained by wired charging, and therefore, charging becomes simple and efficient.

Optionally, after energy of an acquired radio signal is collected, the collected electric energy may be further stored to supply power to the system. In addition, to know in real time information about a quantity of electricity stored, the information about the quantity of electricity stored may be further monitored in real time, and working of the system may be controlled according to the information about the quantity of electricity stored.

For example, if it is obtained, through monitoring, that the information about the quantity of electricity stored indicates insufficiency, control may be performed to strengthen energy collection intensity, so as to collect more radio signals; or if it is obtained, through monitoring, that the information about the quantity of electricity stored indicates abundance, control may be performed to weaken energy collection intensity.

By using the foregoing steps 701 to 704, a process of performing information processing on a currently received radio signal is completed. To control in real time intensity of receiving a signal by an antenna, so as to implement efficient processing on the radio signal that is being currently processed, after the radio signal that is being currently processed is acquired, the following optional step 705 may be further included.

705. If the radio signal that is being currently processed carries the data packet that needs to be processed, reduce a gain value of an antenna that receives the radio signal that is being currently processed, or if the radio signal that is being currently processed does not carry the data packet that needs to be processed, increase a gain value of an antenna that receives the radio signal that is being currently processed.

Specifically, if the radio signal that is being currently processed does not carry the data packet that needs to be processed, to ensure that radio signals in space can be received to the maximum extent, so as to ensure that more energy can be collected, a gain value of an antenna that receives the radio signal that is being currently processed may be increased. If the radio signal that is being currently processed carries the data packet that needs to be processed, a gain value of an antenna that receives the radio signal that is being currently processed may be properly reduced, to achieve an objective of energy conservation.

According to the method provided in this embodiment of the present invention, it is determined whether a radio signal that is being currently processed carries a data packet that needs to be processed, and consequently information processing or energy collection is performed, according to a determining result, on the radio signal that is being currently processed. This not only can avoid wasting resources because the received radio signal that is being currently processed is a radio signal that is not used for communication or that is not used for wireless charging and the radio signal that is being currently processed is discarded, but also can fully use a received radio signal, thereby improving usage of using a received radio signal. In addition, after a radio signal that is being currently processed is received, the radio signal that is being currently processed is processed regardless of whether the radio signal that is being currently processed carries a data packet that needs to be processed; therefore, it is avoided that system resource waste is caused because the radio signal that is being currently processed is received, and therefore, radio signal processing efficiency can be improved.

Figure 8:
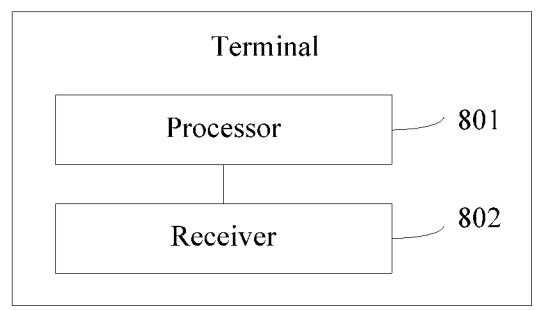
FIG. 8 is a schematic structural diagram of a terminal according to another embodiment of the present invention.

FIG. 8 provides a terminal according to an exemplary embodiment, where the terminal may be configured to perform the radio signal processing method provided in the embodiment corresponding to FIG. 6 or FIG. 7. Referring to FIG. 8, the terminal includes at least one processor 801 and receiver 802.

The receiver 802 is configured to acquire at least one radio signal received by an antenna of a wireless communications system thereof.

The processor 801 is configured to determine whether a radio signal that is being currently processed carries a data packet that needs to be processed.

The processor 801 is further configured to: when the radio signal that is being currently processed carries the data packet that needs to be processed, extract communication information carried in the data packet carried in the radio signal that is being currently processed.

The processor 801 is further configured to: when the radio signal that is being currently processed does not carry the data packet that needs to be processed, collect energy of the radio signal that is being currently processed.

Optionally, the processor 801 is further configured to acquire a signal property of the radio signal that is being currently processed, and determine, according to the signal property of the radio signal that is being currently processed, whether the radio signal that is being currently processed carries the data packet that needs to be processed.

Optionally, the signal property includes a center frequency of the signal, and the processor 801 is further configured to: acquire the center frequency of the radio signal that is being currently processed, and perform matching between the center frequency of the radio signal that is being currently processed and a center frequency of an operating channel of the wireless communications system thereof; and when the center frequency of the radio signal that is being currently processed is consistent with the center frequency of the operating channel of the wireless communications system thereof, determine that the radio signal that is being currently processed carries the data packet that needs to be processed.

Optionally, the processor 801 is further configured to acquire input feedback information, and determine, according to the input feedback information, whether the radio signal that is being currently processed carries the data packet that needs to be processed.

Optionally, the input feedback information includes a moment at which a radio signal that carries the data packet that needs to be processed is input, and the processor 801 is further configured to: acquire the moment at which the radio signal that carries the data packet that needs to be processed is input, and determine a moment at which the radio signal that is being currently processed is received; perform matching between the moment at which the radio signal that is being currently processed is received and the moment at which the radio signal that carries the data packet that needs to be processed is input; and if the moment at which the radio signal that is being currently processed is received matches the moment at which the radio signal that carries the data packet that needs to be processed is input, determine that the radio signal that is being currently processed carries the data packet that needs to be processed.

Optionally, the processor 801 is further configured to determine the moment at which the radio signal that carries the data packet that needs to be processed is input, and generate the input feedback information that includes the moment at which the radio signal that carries the data packet that needs to be processed is input.

Optionally, the input feedback information includes indication information of a previous signal of the radio signal that is being currently processed, and the processor 801 is further configured to: acquire the indication information of the previous signal of the radio signal that is being currently processed, and determine whether the indication information of the previous signal of the radio signal that is being currently processed indicates that a next radio signal that carries the data packet that needs to be processed exists; and when the indication information of the previous signal of the radio signal that is being currently processed indicates that the next radio signal that carries the data packet that needs to be processed exists, determine that the radio signal that is being currently processed carries the data packet that needs to be processed.

Optionally, the processor 801 is further configured to process the previous signal of the radio signal that is being currently processed, to acquire the indication information of the previous signal of the radio signal that is being currently processed, and acquire, by using the indication information of the previous signal of the radio signal that is being currently processed as the input feedback information, the input feedback information that includes the indication information of the previous signal of the radio signal that is being currently processed.

Optionally, the processor 801 is further configured to: determine an antenna that receives the radio signal that is being currently processed, and determine whether the antenna that receives the radio signal that is being currently processed is a preset antenna configured to receive a radio signal that carries the data packet that needs to be processed; and when it is determined that the antenna that receives the radio signal that is being currently processed is a preset antenna configured to receive a radio signal that carries the data packet that needs to be processed, determine that the radio signal that is being currently processed carries the data packet that needs to be processed.

Optionally, the processor 801 is further configured to parse the radio signal that is being currently processed, and obtain, according to a parsing result, a signal format of the radio signal that is being currently processed; determine, according to the signal format of the radio signal that is being currently processed, whether the radio signal that is being currently processed is a radio signal of the system thereof; and when determining that the radio signal that is being currently processed is a radio signal of the system thereof, determine whether the radio signal that is being currently processed carries the data packet that needs to be processed.

Optionally, the processor 801 is further configured to: when the radio signal that is being currently processed carries the data packet that needs to be processed, reduce a gain value of an antenna that receives the radio signal that is being currently processed, or when the radio signal that is being currently processed does not carry the data packet that needs to be processed, increase a gain value of an antenna that receives the radio signal that is being currently processed.

According to the terminal provided in this embodiment of the present invention, the processor determines whether a radio signal that is being currently processed carries a data packet that needs to be processed, and consequently information processing or energy collection is performed, according to a determining result, on the radio signal that is being currently processed. This not only can avoid wasting resources because the received radio signal that is being currently processed is a radio signal that is not used for communication or that is not used for wireless charging and the radio signal that is being currently processed is discarded, but also can fully use a received radio signal, thereby improving usage of using a received radio signal. In addition, after a radio signal that is being currently processed is received, the radio signal that is being currently processed is processed regardless of whether the radio signal that is being currently processed carries a data packet that needs to be processed; therefore, it is avoided that system resource waste is caused because the radio signal that is being currently processed is received, and therefore, radio signal processing efficiency can be improved.

It should be noted that, when the radio signal processing apparatus and the terminal provided in the foregoing embodiments process a radio signal, the foregoing functional modules are classified merely for the purpose of an exemplary description. In an actual application, the foregoing functions may be allocated to different functional modules for implementation according to a requirement. That is, an internal structure of a device is divided into different functional modules, to perform all or some functions described above. In addition, the radio signal processing apparatus and the terminal provided in the foregoing embodiments belong to a same idea as that of the embodiments of the radio signal processing method; for a specific implementation process thereof, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A radio signal processing apparatus comprising:
   a processor;
   a memory storing a program to be executed in the processor, the program comprising a plurality of modules of instruction, the plurality of modules comprising an acquiring module, a preprocessing module, an information processing module, and an energy collection module,
   wherein the acquiring module is configured to:
      acquire a radio signal that is used to perform communication using a wireless communication protocol and is received by an antenna connected to the acquiring module, wherein the radio signal is sent by a network access device of a wireless communications system thereof, and wherein the network access device is a wireless access point or a base station, and
      send the acquired radio signal to the preprocessing module to perform processing;
   wherein the preprocessing module is configured to:
      determine, while the radio signal is being currently processed, that the radio signal carries a data packet that needs to be processed and, in response to determining that the radio signal that is being currently processed carries the data packet that needs to be processed, send the radio signal that is being currently processed to the information processing module to perform processing, and
      determine, while the radio signal is being currently processed, that the radio signal does not carry a data packet that needs to be processed and, in response to determining that the radio signal used to perform communication that is being currently processed does not carry the data packet that needs to be processed, send the radio signal that is being currently processed to the energy collection module to perform processing;
   wherein the information processing module is configured to receive the radio signal that is being currently processed and that is sent by the preprocessing module, and extract communication information carried in the data packet carried in the radio signal that is being currently processed; and
   wherein the energy collection module is configured to receive the radio signal that is being currently processed and that is sent by the preprocessing module, and collect energy of the radio signal that is being currently processed.

2. The apparatus according to claim 1, wherein the preprocessing module comprises:
   a first acquiring unit configured to acquire a signal property of the radio signal that is being currently processed; and
   a first determining unit configured to determine, according to the signal property of the radio signal that is being currently processed, whether the radio signal that is being currently processed carries the data packet that needs to be processed.

3. The apparatus according to claim 2, wherein the signal property comprises a center frequency of the radio signal, and the first acquiring unit is configured to acquire the center frequency of the radio signal that is being currently processed; and
   wherein the first determining unit is configured to:
      perform matching between the center frequency of the radio signal that is being currently processed and a center frequency of an operating channel of the wireless communications system thereof, and
      when the center frequency of the radio signal that is being currently processed is consistent with the center frequency of the operating channel of the wireless communications system thereof, determine that the radio signal that is being currently processed carries the data packet that needs to be processed.

4. The apparatus according to claim 2, wherein the plurality of modules of instruction further comprises:
   a parsing module configured to parse the radio signal that is being currently processed, and obtain, according to a parsing result, a signal format of the radio signal that is being currently processed; and wherein the preprocessing module further comprises:
   a second determining unit, configured to determine, according to the signal format of the radio signal that is being currently processed, whether the radio signal that is being currently processed is a radio signal of the wireless communications system thereof; and
   a third determining unit, configured to: in response to determining that the radio signal that is being currently processed is a radio signal of the wireless communications system thereof, determine whether the radio signal that is being currently processed carries the data packet that needs to be processed.

5. The apparatus according to claim 1, wherein the plurality of modules of instruction further comprises a wireless transceiver scheduling and management module, wherein the wireless transceiver scheduling and management module comprises:
   an acquiring unit, configured to acquire input feedback information, wherein the input feedback information is used to indicate whether the radio signal that is being currently processed carries the data packet that needs to be processed; and
a sending unit, configured to send the input feedback information to the preprocessing module; and
wherein the preprocessing module further comprises:
a second acquiring unit, configured to acquire the input feedback information acquired by the wireless transceiver scheduling and management module; and
a second determining unit, configured to determine, according to the input feedback information, whether the radio signal that is being currently processed carries the data packet that needs to be processed.

6. The apparatus according to claim 5, wherein the input feedback information comprises a moment at which a radio signal that carries the data packet that needs to be processed is input, and the second acquiring unit is configured to acquire the moment at which the radio signal that carries the data packet that needs to be processed is input; and
wherein the second determining unit is configured to:
determine a moment at which the radio signal that is being currently processed is received, and
perform matching between the moment at which the radio signal that is being currently processed is received and the moment at which the radio signal that carries the data packet that needs to be processed is input; and
when the moment at which the radio signal that is being currently processed is received matches the moment at which the radio signal that carries the data packet that needs to be processed is input, determine that the radio signal that is being currently processed carries the data packet that needs to be processed.

7. The apparatus according to claim 6, wherein the acquiring unit in the wireless transceiver scheduling and management module is configured to
determine the moment at which the radio signal that carries the data packet that needs to be processed is input, and generate the input feedback information that comprises the moment at which the radio signal that carries the data packet that needs to be processed is input.

8. The apparatus according to claim 5, wherein the input feedback information comprises indication information of a previous signal of the radio signal that is being currently processed, and the second acquiring unit is configured to acquire the indication information of the previous signal of the radio signal that is being currently processed; and
wherein the second determining unit is configured to:
determine whether the indication information of the previous signal of the radio signal that is being currently processed indicates that a next radio signal that carries the data packet that needs to be processed exists, and
when the indication information of the previous signal of the radio signal that is being currently processed indicates that the next radio signal that carries the data packet that needs to be processed exists, determine that the radio signal that is being currently processed carries the data packet that needs to be processed.

9. The apparatus according to claim 8, wherein the acquiring unit in the wireless transceiver scheduling and management module is configured to
acquire, from the information processing module, the indication information of the previous signal of the radio signal that is being currently processed, and
acquire, by using the indication information of the previous signal of the radio signal that is being currently processed as the input feedback information, the input feedback information that comprises the indication information of the previous signal of the radio signal that is being currently processed.

10. The apparatus according to claim 1, wherein the preprocessing module comprises:
a first determining unit, configured to determine an antenna that receives the radio signal that is being currently processed;
a second determining unit, configured to determine whether the antenna that receives the radio signal that is being currently processed is a preset antenna configured to receive a radio signal that carries the data packet that needs to be processed; and
a third determining unit, configured to: in response to determining that the antenna that receives the radio signal that is being currently processed is the preset antenna configured to receive the radio signal that carries the data packet that needs to be processed, determine that the radio signal that is being currently processed carries the data packet that needs to be processed.

11. The apparatus according to claim 1, wherein the plurality of modules further comprises:
a gain adjustment module, configured to: when the radio signal that is being currently processed carries the data packet that needs to be processed, reduce a gain value of an antenna that receives the radio signal that is being currently processed, or when the radio signal that is being currently processed does not carry the data packet that needs to be processed, increase a gain value of an antenna that receives the radio signal that is being currently processed.

12. A radio signal processing method comprising:
acquiring at least one radio signal used to perform communication using a wireless communication protocol and received by an antenna of a wireless communications system, wherein the at least one radio signal is sent by a network access device, and wherein the network access device is a wireless access point or a base station;
determining, while the radio signal used to perform communication is being currently processed, that the radio signal carries a data packet that needs to be processed; and
in response to determining that the radio signal used to perform communication that is being currently processed carries the data packet that needs to be processed, extracting communication information carried in the data packet carried in the radio signal used to perform communication that is being currently processed, or
in response to determining that the radio signal used to perform communication that is being currently processed does not carry the data packet that needs to be processed, collecting energy of the radio signal used to perform communication that is being currently processed.

13. The method according to claim 12, wherein the determining whether a radio signal that is being currently processed carries a data packet that needs to be processed comprises:
acquiring a signal property of the radio signal that is being currently processed; and
determining, according to the signal property of the radio signal that is being currently processed, whether the radio signal that is being currently processed carries the data packet that needs to be processed.

14. The method according to claim 13, wherein the signal property comprises a center frequency of the radio signal, and the acquiring a signal property of the radio signal that is being currently processed comprises:
acquiring the center frequency of the radio signal that is being currently processed; and
the determining, according to the signal property of the radio signal that is being currently processed, whether the radio signal that is being currently processed carries the data packet that needs to be processed comprises:
performing matching between the center frequency of the radio signal that is being currently processed and a center frequency of an operating channel of the wireless communications system thereof; and
in response to determining that the center frequency of the radio signal that is being currently processed is consistent with the center frequency of the operating channel of the wireless communications system thereof, determining that the radio signal that is being currently processed carries the data packet that needs to be processed.

15. The method according to claim 13, before the determining whether a radio signal that is being currently processed carries a data packet that needs to be processed, further comprising:
parsing the radio signal that is being currently processed;
obtaining, according to a parsing result, a signal format of the radio signal that is being currently processed;
determining, according to the signal format of the radio signal that is being currently processed, whether the radio signal that is being currently processed is a radio signal of the wireless communications system thereof; and
in response to determining that the radio signal that is being currently processed is a radio signal of the wireless communications system thereof, performing the step of determining whether a radio signal that is being currently processed carries a data packet that needs to be processed.

16. The method according to claim 12, wherein the determining whether a radio signal that is being currently processed carries a data packet that needs to be processed comprises:
acquiring input feedback information; and
determining, according to the input feedback information, whether the radio signal that is being currently processed carries the data packet that needs to be processed.

17. The method according to claim 16, wherein the input feedback information comprises a moment at which a radio signal that carries the data packet that needs to be processed is input, and the acquiring input feedback information comprises:
acquiring the moment at which the radio signal that carries the data packet that needs to be processed is input; and
the determining, according to the input feedback information, whether the radio signal that is being currently processed carries the data packet that needs to be processed comprises:
determining a moment at which the radio signal that is being currently processed is received;
performing matching between the moment at which the radio signal that is being currently processed is received and the moment at which the radio signal that carries the data packet that needs to be processed is input; and
in response to determining that the moment at which the radio signal that is being currently processed is received matches the moment at which the radio signal that carries the data packet that needs to be processed is input, determining that the radio signal that is being currently processed carries the data packet that needs to be processed.

18. The method according to claim 17, wherein the acquiring the moment at which the radio signal that carries the data packet that needs to be processed is input comprises:
determining the moment at which the radio signal that carries the data packet that needs to be processed is input; and
generating the input feedback information that comprises the moment at which the radio signal that carries the data packet that needs to be processed is input.

19. The method according to claim 16, wherein the input feedback information comprises indication information of a previous signal of the radio signal that is being currently processed, and the acquiring input feedback information comprises:
acquiring the indication information of the previous signal of the radio signal that is being currently processed; and
the determining, according to the input feedback information, whether the radio signal that is being currently processed carries the data packet that needs to be processed comprises:
determining whether the indication information of the previous signal of the radio signal that is being currently processed indicates that a next radio signal that carries the data packet that needs to be processed exists; and
in response to determining that the indication information of the previous signal of the radio signal that is being currently processed indicates that the next radio signal that carries the data packet that needs to be processed exists, determining that the radio signal that is being currently processed carries the data packet that needs to be processed.

20. The method according to claim 19, wherein the acquiring the indication information of the previous signal of the radio signal that is being currently processed comprises:
processing the previous signal of the radio signal that is being currently processed, to acquire the indication information of the previous signal of the radio signal that is being currently processed, and acquiring, by using the indication information of the previous signal of the radio signal that is being currently processed as the input feedback information, the input feedback information that comprises the indication information of the previous signal of the radio signal that is being currently processed.

21. The method according to claim 12, wherein the determining whether a radio signal that is being currently processed carries a data packet that needs to be processed comprises:
determining an antenna that receives the radio signal that is being currently processed;
determining whether the antenna that receives the radio signal that is being currently processed is a preset antenna configured to receive a radio signal that carries the data packet that needs to be processed; and in response to determining that the antenna that receives the radio signal that is being currently processed is the preset antenna configured to receive the radio signal that carries the data packet that needs to be processed, determining that the radio signal that is being currently processed carries the data packet that needs to be processed.

22. The method according to claim 12, after the determining whether a radio signal that is being currently processed carries a data packet that needs to be processed, further comprising:
in response to determining that the radio signal that is being currently processed carries the data packet that needs to be processed, reducing a gain value of an antenna that receives the radio signal that is being currently processed; or
in response to determining that the radio signal that is being currently processed does not carry the data packet that needs to be processed, increasing a gain value of an antenna that receives the radio signal that is being currently processed.

23. A terminal comprising:
a processor;
a memory storing a program to be executed in the processor; and
a receiver configured to:
acquire at least one radio signal used to perform communication using a wireless communication protocol and received by an antenna of the terminal, wherein the at least one radio signal is sent by a network access device of a wireless communications system, and wherein the network access device is a wireless access point or a base station, and
send the acquired at least one radio signal used to perform communication to the processor to perform processing; and
the program comprises instructions for:
determining, while the radio signal used to perform communication is being currently processed, that the radio signal carries a data packet that needs to be processed and, in response to determining that the radio signal used to perform communication that is being currently processed carries the data packet that needs to be processed, extracting communication information carried in the data packet carried in the radio signal used to perform communication that is being currently processed, and
determining, while the radio signal used to perform communication is being currently processed, that the radio signal does not carry the data packet that needs to be processed and, in response to determining that the radio signal used to perform communication that is being currently processed does not carry the data packet that needs to be processed, collecting energy of the radio signal used to perform communication that is being currently processed.

24. The terminal according to claim 23, wherein the program comprises further instructions to
acquire a signal property of the radio signal that is being currently processed, and
determine, according to the signal property of the radio signal that is being currently processed, whether the radio signal that is being currently processed carries the data packet that needs to be processed.

25. The terminal according to claim 24, wherein the signal property comprises a center frequency of the radio signal, and the program comprises further instructions to:
acquire the center frequency of the radio signal that is being currently processed, and
perform matching between the center frequency of the radio signal that is being currently processed and a center frequency of an operating channel of the wireless communications system; and
in response to determining that the center frequency of the radio signal that is being currently processed is consistent with the center frequency of the operating channel of the wireless communications system thereof, determine that the radio signal that is being currently processed carries the data packet that needs to be processed.

26. The terminal according to claim 24, wherein the program comprises further instructions to:
parse the radio signal that is being currently processed, and
obtain, according to a parsing result, a signal format of the radio signal that is being currently processed;
determine, according to the signal format of the radio signal that is being currently processed, whether the radio signal that is being currently processed is a radio signal of the wireless communications system thereof; and
in response to determining that the radio signal that is being currently processed is a radio signal of the wireless communications system thereof, perform the step of determining whether the radio signal that is being currently processed carries the data packet that needs to be processed.

27. The terminal according to claim 23, wherein the program comprises further instructions to acquire input feedback information, and determine, according to the input feedback information, whether the radio signal that is being currently processed carries the data packet that needs to be processed.

28. The terminal according to claim 27, wherein the input feedback information comprises a moment at which a radio signal that carries the data packet that needs to be processed is input, and the processor is further configured to:
acquire the moment at which the radio signal that carries the data packet that needs to be processed is input, and determine a moment at which the radio signal that is being currently processed is received;
perform matching between the moment at which the radio signal that is being currently processed is received and the moment at which the radio signal that carries the data packet that needs to be processed is input; and
in response to determining that the moment at which the radio signal that is being currently processed is received matches the moment at which the radio signal that carries the data packet that needs to be processed is input, determine that the radio signal that is being currently processed carries the data packet that needs to be processed.

29. The terminal according to claim 28, wherein the program comprises further instructions to:
determine the moment at which the radio signal that carries the data packet that needs to be processed is input, and generate the input feedback information that comprises the moment at which the radio signal that carries the data packet that needs to be processed is input.

30. The terminal according to claim 27, wherein the input feedback information comprises indication information of a previous signal of the radio signal that is being currently processed, and the program further comprises instructions to:
- acquire the indication information of the previous signal of the radio signal that is being currently processed, and determine whether the indication information of the previous signal of the radio signal that is being currently processed indicates that a next radio signal that carries the data packet that needs to be processed exists; and
- in response to determining that the indication information of the previous signal of the radio signal that is being currently processed indicates that the next radio signal that carries the data packet that needs to be processed exists, determine that the radio signal that is being currently processed carries the data packet that needs to be processed.

31. The terminal according to claim 30, wherein the program comprises further instructions to process the previous signal of the radio signal that is being currently processed, to
- acquire the indication information of the previous signal of the radio signal that is being currently processed, and
- acquire, by using the indication information of the previous signal of the radio signal that is being currently processed as the input feedback information, the input feedback information that comprises the indication information of the previous signal of the radio signal that is being currently processed.

32. The terminal according to claim 23, wherein the program comprises further instructions to:
- determine an antenna that receives the radio signal that is being currently processed, and determine whether the antenna that receives the radio signal that is being currently processed is a preset antenna configured to receive a radio signal that carries the data packet that needs to be processed; and
- in response to determining that the antenna that receives the radio signal that is being currently processed is a preset antenna configured to receive a radio signal that carries the data packet that needs to be processed, determine that the radio signal that is being currently processed carries the data packet that needs to be processed.

33. The terminal according to claim 23, wherein the program comprises further instructions to:
- in response to determining that the radio signal that is being currently processed carries the data packet that needs to be processed, reduce a gain value of an antenna that receives the radio signal that is being currently processed, or
- in response to determining that the radio signal that is being currently processed does not carry the data packet that needs to be processed, increase a gain value of an antenna that receives the radio signal that is being currently processed.

* * * * *